United States Patent
Okada

(10) Patent No.: US 11,131,912 B2
(45) Date of Patent: Sep. 28, 2021

(54) PROJECTOR

(71) Applicant: SEIKO EPSON CORPORATION, Tokyo (JP)

(72) Inventor: Naoya Okada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/029,723

(22) Filed: Sep. 23, 2020

(65) Prior Publication Data

US 2021/0088886 A1  Mar. 25, 2021

(30) Foreign Application Priority Data

Sep. 24, 2019  (JP) ............................. JP2019-172655

(51) Int. Cl.
  *G03B 21/16* (2006.01)
  *H04N 9/31* (2006.01)

(52) U.S. Cl.
  CPC ........... *G03B 21/16* (2013.01); *H04N 9/3144* (2013.01)

(58) Field of Classification Search
  CPC ............................... G03B 21/16; H04N 9/3144
  USPC ........................................................ 353/54
  See application file for complete search history.

(56) References Cited

U.S. PATENT DOCUMENTS

| 8,517,540 B2 | 8/2013 | Terao |
| 2002/0191159 A1 | 12/2002 | Nagao et al. |
| 2009/0086169 A1 | 4/2009 | Nakamura |
| 2010/0132379 A1 | 6/2010 | Wu et al. |
| 2011/0242499 A1* | 10/2011 | Terao .................. H04N 9/3144 353/57 |
| 2019/0196311 A1 | 6/2019 | Sugiyama et al. |

FOREIGN PATENT DOCUMENTS

| JP | H11-057383 A | 3/1999 |
| JP | H11-169644 A | 6/1999 |
| JP | H11-223464 A | 8/1999 |
| JP | 2002-107698 A | 4/2002 |
| JP | 2002-326012 A | 11/2002 |
| JP | 2002-372748 A | 12/2002 |
| JP | 2007-294655 A | 11/2007 |
| JP | 2009-086271 A | 4/2009 |
| JP | 2010-107751 A | 5/2010 |
| JP | 2011-036768 A | 2/2011 |

(Continued)

*Primary Examiner* — Jerry L Brooks
(74) *Attorney, Agent, or Firm* — Oliff PLC

(57) ABSTRACT

A projector includes a cooler configured to cool a cooling target based on transformation of a refrigerant into a gas. The cooler includes a refrigerant generator and a refrigerant sender. The refrigerant generator includes a rotating moisture absorbing/discharging member, a first air blower configured to deliver air containing the refrigerant transformed into the gas at the cooling target to a first portion of the moisture absorbing/discharging member located in a first region, a heat exchanger connected to the refrigerant sender, and a second air blower configured to cool the heat exchanger. The air having passed through the first portion of the moisture absorbing/discharging member flows into the heat exchanger. Air exhausted from the heat exchanger is delivered to a second portion of the moisture absorbing/discharging member located in a second region different from the first region.

8 Claims, 12 Drawing Sheets

(56) References Cited

FOREIGN PATENT DOCUMENTS

| | | | |
|---|---|---|---|
| JP | 2011-215457 | A | 10/2011 |
| JP | 2014-087797 | A | 5/2014 |
| JP | 2019-117332 | A | 7/2019 |

\* cited by examiner

PROJECTOR

The present application is based on, and claims priority from JP Application Serial Number 2019-172655, filed Sep. 24, 2019, the disclosure of which is hereby incorporated by reference herein in its entirety.

BACKGROUND

1. Technical Field

The present disclosure relates to a projector.

2. Related Art

JP-A-2019-117332 describes a projector including a refrigerant generator that generates a refrigerant. In the projector described in JP-A-2019-117332, a cooling target in the projector is cooled based on transformation of the refrigerant generated in the refrigerant generator into a gas.

The projector described above has been required to further improve refrigerant generation efficiency of the refrigerant generator.

SUMMARY

An aspect of a projector according to the present disclosure is directed to a projector including a cooling target, the projector including a light source configured to emit light, a light modulator configured to modulate the light emitted from the light source in accordance with an image signal, a projection optical apparatus configured to project the light modulated by the light modulator, and a cooler configured to cool the cooling target based on transformation of a refrigerant into a gas. The cooler includes a refrigerant generator configured to generate the refrigerant and a refrigerant sender configured to send the generated refrigerant toward the cooling target. The refrigerant generator includes a rotating moisture absorbing/discharging member, a first air blower configured to deliver air containing the refrigerant transformed into the gas at the cooling target to a first portion of the moisture absorbing/discharging member which is a portion located in a first region, a heat exchanger connected to the refrigerant sender, and a second air blower configured to cool the heat exchanger. The air after passing through the first portion of the moisture absorbing/discharging member flows into the heat exchanger. Air exhausted from the heat exchanger is delivered to a second portion of the moisture absorbing/discharging member which is a portion located in a second region different from the first region.

The refrigerant generator may include a heater configured to heat the air before delivered to the first portion of the moisture absorbing/discharging member.

The first air blower may deliver air to the cooling target and deliver the air after delivered to the cooling target to the first portion of the moisture absorbing/discharging member.

The air after exhausted from the heat exchanger and after passing through the second portion of the moisture absorbing/discharging member may be delivered to the first portion of the moisture absorbing/discharging member.

The air exhausted from the heat exchanger may pass multiple times through the second portion of the moisture absorbing/discharging member.

The projector may further include a power supply configured to supply the projector with electric power. Air after cooling the power supply may be delivered to the first portion of the moisture absorbing/discharging member.

The refrigerant generator may include a thermoelectric device having a heat absorbing surface and a heat dissipating surface, a first heat transfer member thermally connected to the heat absorbing surface, and a second heat transfer member thermally connected to the heat dissipating surface. The first heat transfer member may cool the air delivered to the heat exchanger. The second heat transfer member may heat the air before delivered to the first portion of the moisture absorbing/discharging member.

The cooling target may be the light modulator.

DESCRIPTION OF EXEMPLARY EMBODIMENTS

A projector according to each embodiment of the present disclosure will be described below with reference to the drawings. The scope of the present disclosure is not limited to the following embodiments and can be arbitrarily changed within the scope of the technical idea of the present disclosure. In the following drawings, for clarity of each configuration, the scale, the number, and other factors of the structure of the configuration differ from the scale, the number, and the other factors of the actual structure of the configuration in some cases.

First Embodiment

Figure 1:
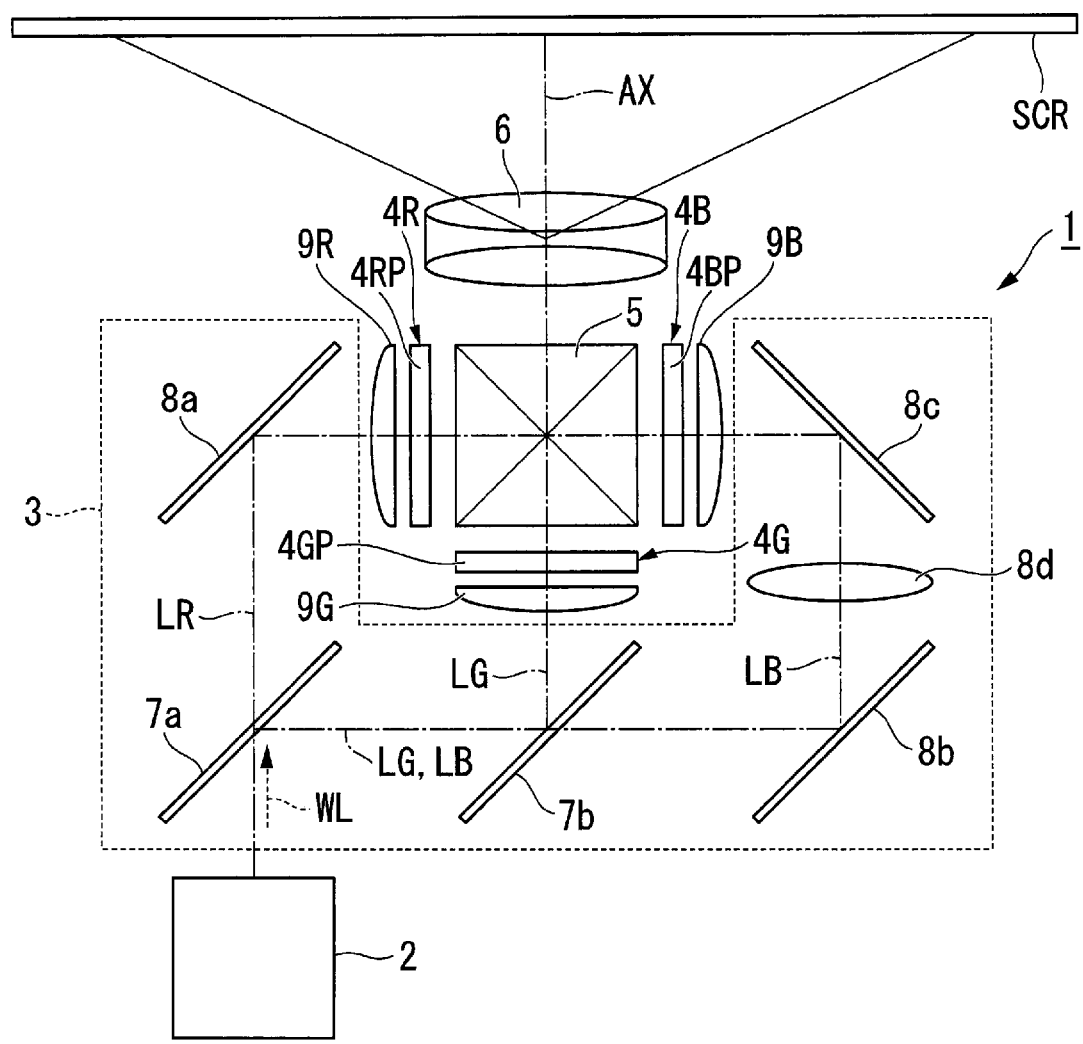
FIG. 1 is a schematic configuration diagram showing a projector according to a first embodiment.
Figure 2:
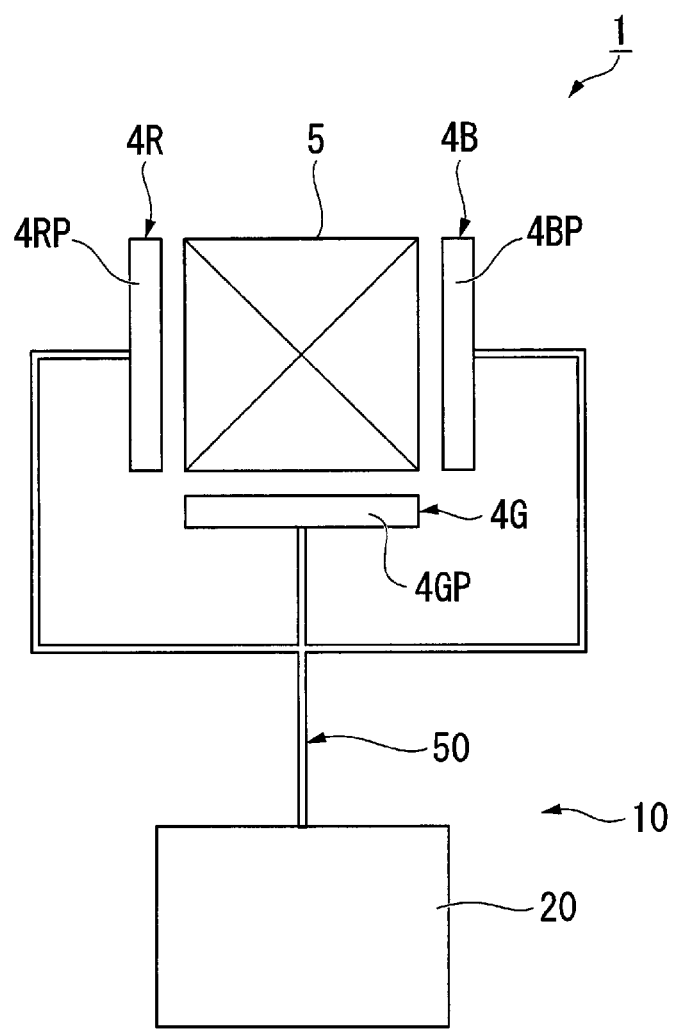
FIG. 2 is a diagrammatic view showing part of the projector according to the first embodiment.

FIG. 1 is a schematic configuration diagram showing a projector 1 according to the present embodiment. FIG. 2 is a diagrammatic view showing part of the projector 1 according to the present embodiment. The projector 1 includes a light source 2, a color separation system 3, a light modulation unit 4R, a light modulation unit 4G, a light modulation unit 4B, a light combining system 5, and a projection optical apparatus 6, as shown in FIG. 1. The light modulation unit 4R includes a light modulator 4RP. The light modulation unit 4G includes a light modulator 4GP. The light modulation unit 4B includes a light modulator 4BP.

The light source 2 outputs illumination light WL, which is adjusted to have a substantially uniform illuminance distribution, toward the color separation system 3. The light source 2 is, for example, a semiconductor laser. The color separation system 3 separates the illumination light WL from the light source 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source 2 into the red light LR and light containing the green light LG and the blue light LB mixed with each other. The first dichroic mirror 7a is so characterized as to transmit the red light LR and reflect the green light LG and the blue light LB. The second dichroic mirror 7b separates the light containing the green light LG and the blue light LB mixed with each other into the green light LG and the blue light LB. The second dichroic mirror 7b is so characterized as to reflect the green light LG and transmit the blue light LB.

The first reflection mirror 8a is disposed in the optical path of the red light LR and reflects the red light LR having passed through the first dichroic mirror 7a toward the light modulator 4RP. The second reflection mirror 8b and the third reflection mirror 8c are disposed in the optical path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light outputted from the light source 2 in accordance with an image signal. The light modulator 4GP modulates the green light LG out of the light outputted from the light source 2 in accordance with an image signal. The light modulator 4BP modulates the blue light LB out of the light outputted from the light source 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a substantially cubic shape. The light combining system 5 combines the color image light fluxes from the light modulators 4RP, 4GP, and 4BP with one another. The light combining system 5 outputs the combined image light toward the projection optical apparatus 6. The projection optical apparatus 6 is formed of a projection lens group. The projection optical apparatus 6 enlarges the combined image light from the light combining system 5, that is, the light fluxes modulated by the light modulators 4RP, 4GP, and 4BP and projects the enlarged image light, that is, the enlarged modulated light fluxes toward a screen SCR. An enlarged color image (video) is thus displayed on the screen SCR.

The projector 1 further includes a cooler 10, as shown in FIG. 2. The cooler 10, in which a refrigerant W is transformed into a gas, cools a cooling target provided in the projector 1. In the present embodiment, the refrigerant W is, for example, water in the liquid form. In the following description, the transformation of the refrigerant W into a gas is therefore simply called vaporization in some cases. In the present embodiment, the cooling target includes the light modulation units 4R, 4G, and 4B. That is, in the present embodiment, the cooling target includes the light modulators 4RP, 4GP, and 4BP. In the present embodiment, the light modulators 4RP, 4GP, and 4BP form a cooling target main body.

The cooler 10 includes a refrigerant generator 20 and a refrigerant sender 50. The refrigerant generator 20 is a portion that generates the refrigerant W from a substance contained the air. The refrigerant sender 50 is a portion that sends the generated refrigerant W toward the cooling target. The refrigerant W delivered by the refrigerant sender 50 to the cooling target, that is, the light modulation units 4R, 4G, and 4B in the present embodiment vaporizes so as to be capable of drawing heat from the cooling target. The cooler 10 can thus cool the cooling target. The refrigerant generator 20 and the refrigerant sender 50 will be described below in detail.

Figure 3:
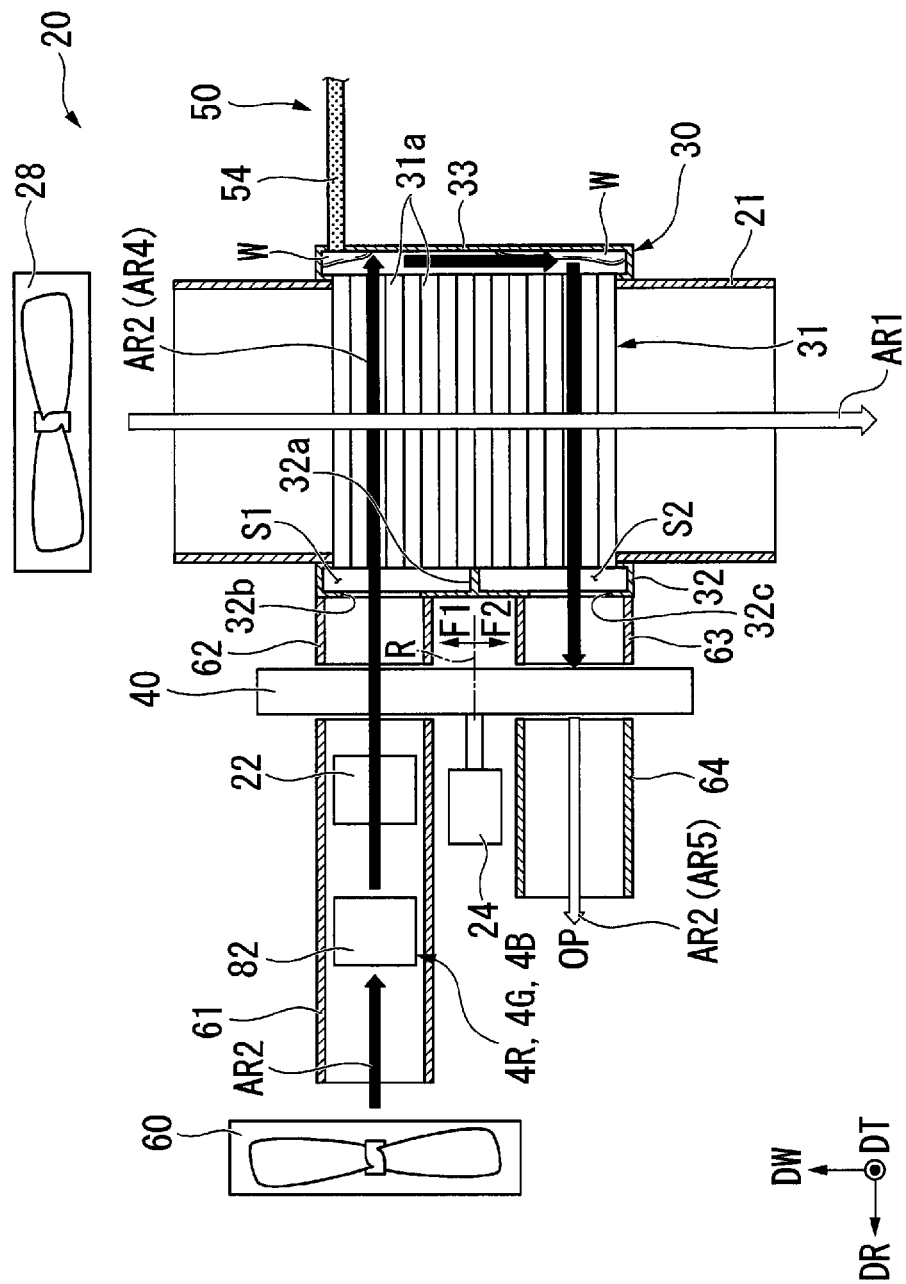
FIG. 3 is a schematic configuration diagram diagrammatically showing a refrigerant generator in the first embodiment.

FIG. 3 is a schematic configuration diagram diagrammatically showing the refrigerant generator 20 in the present embodiment. The refrigerant generator 20 includes a moisture absorbing/discharging member 40, a motor (driver) 24, a first air blower 60, a first duct 61, a second duct 62, a third duct 63, a fourth duct 64, a heat exchanger 30, a heater 22, a second air blower 28, and a cooling duct 21, as shown in FIG. 3.

Figure 4:
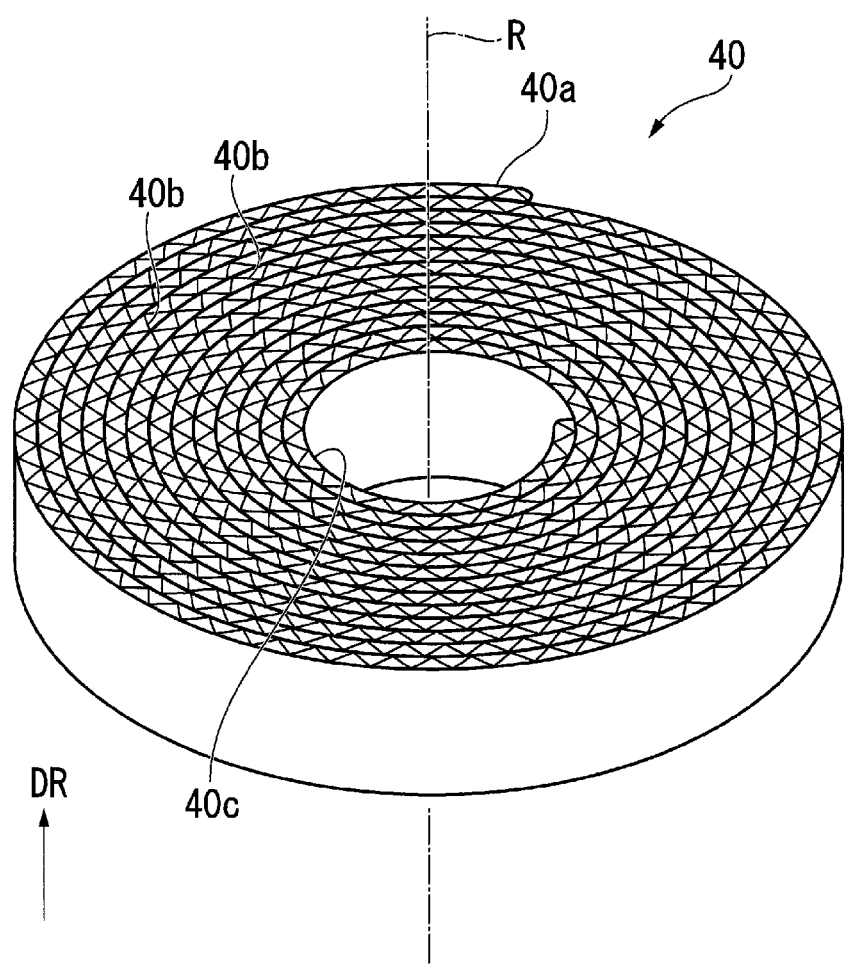
FIG. 4 is a perspective view showing a moisture absorbing/discharging member in the first embodiment.

FIG. 4 is a perspective view showing the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR in the drawings.

One direction perpendicular to the rotational axis direction DR is called a "width direction DW" and drawn as appropriate in the form of an axis DW in the drawings. The direction perpendicular both to the rotational axis direction DR and the width direction DW is called a "thickness direction DT" and drawn as appropriate in the form of an axis DT in the drawings. In the present embodiment, the rotational axis direction DR is the rightward/leftward direction in FIG. 3, and the width direction DW is the upward/downward direction in FIG. 3.

The moisture absorbing/discharging member 40 has an innumerable number of through holes 40b, which pass through the moisture absorbing/discharging member 40 in the rotational axis direction DR, as shown in FIG. 4. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. A surface of the wound band-shaped member 40a that is the surface exposed to the ambient environment includes the outer surface of the moisture absorbing/discharging member 40, the inner circumferential surface of the central hole 40c, and the inner surface of each of the through holes 40b. The moisture absorbing/discharging member 40 may instead be entirely made of a substance that absorbs and discharges moisture. Examples of the substance that absorbs and discharges moisture may include zeolite and silica gel.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 0.2 rpm but smaller than or equal to 5 rpm.

The first air blower 60 is, for example, an intake fan that takes the air in the ambient environment into the projector 1. The first air blower 60 delivers air AR2 to a portion of the moisture absorbing/discharging member 40 that is the portion located in a first region F1. The first region F1 is a region on one side of the axis of rotation R in the direction perpendicular to the axis of rotation R. On the other hand, the region on the other side of the axis of rotation R in the direction perpendicular to the axis of rotation R, that is, the region opposite the first region F1 with respect to the axis of rotation R is a second region F2. The first region F1 is a region above the axis of rotation R in FIG. 3. The second region F2 is a region below the axis of rotation R in FIG. 3. In the present embodiment, the first region F1 and the second region F2 are separate with respect to the axis of rotation R from each other in the width direction DW perpendicular to the rotational axis direction DR.

The first air blower 60 delivers the air AR2 also to the light modulation units 4R, 4G, and 4B, which form the cooling target, as shown in FIG. 3. That is, in the present embodiment, the first air blower 60 is a cooling air blower that delivers the air AR2 to the cooling target. The first air blower 60 delivers the air AR2 having been delivered to the light modulation units 4R, 4G, and 4B to a portion of the moisture absorbing/discharging member 40 that is the portion located in the first region F1. The first air blower 60 is not limited to a specific apparatus and may be any apparatus capable of delivering the air AR2, for example, an axial fan and a centrifugal fan.

Figure 5:
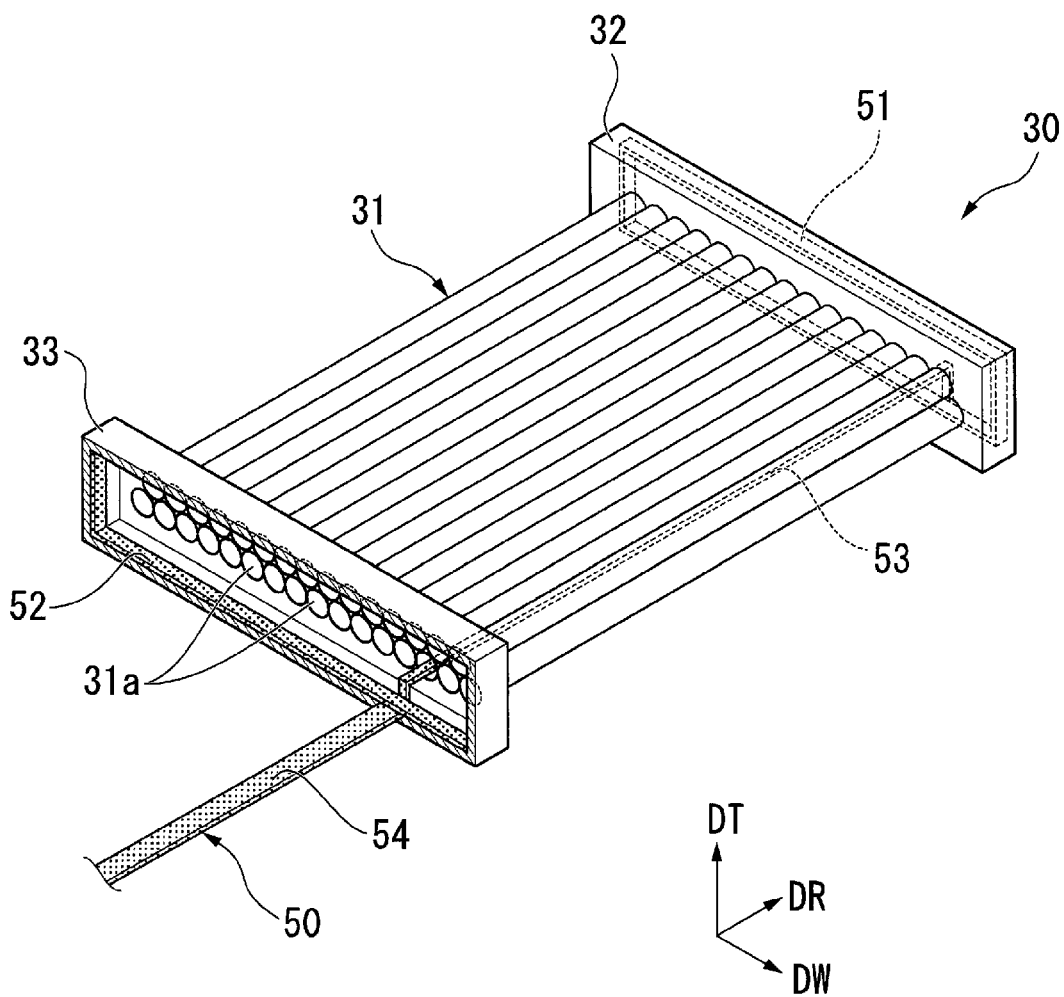
FIG. 5 is a partial cross-sectional perspective view showing a heat exchanger in the first embodiment.

The heat exchanger 30 is a portion that generates the refrigerant W. The heat exchanger 30 is located on the other side of the rotational axis direction DR (−DR side) of the moisture absorbing/discharging member 40. FIG. 5 is a partial cross-sectional perspective view showing the heat exchanger 30. The heat exchanger 30 includes a flow passage 31, a first lid 32, and a second lid 33, as shown in FIG. 5.

The flow passage 31 includes a plurality of tubular pipes 31a extending in the rotational axis direction DR. The pipes 31a are each open at the opposite ends thereof in the rotational axis direction DR. The pipes 31a each have, for example, a circular cross-sectional shape perpendicular to the rotational axis direction DR.

In the present embodiment, the flow passage 31 is formed by layering a plurality of layers, which are each formed of a plurality of the pipes 31a arranged in the width direction DW, on each other in the thickness direction DT. In the present embodiment, the dimension of the flow passage 31 in the thickness direction DT is, for example, smaller than the dimension of the flow passage 31 in the width direction DW or is the smallest of the dimensions of the flow passage 31 in the directions perpendicular to the rotational axis direction DR.

The first lid 32 is connected to an end of the flow passage 31 that is the end on one side in the rotational axis direction DR (+DR side). The first lid 32 has the shape of a rectangular parallelepiped box elongated in the width direction DW. One end of each of the pipes 31a in the rotational axis direction DR is open in the first lid 32. A partition 32a is provided in the first lid 32, as shown in FIG. 3. The partition 32a partitions the interior of the first lid 32 into a first space S1 and a second space S2 disposed side by side in the width direction DW. In FIG. 3, the first space S1 is located above the second space S2 (+DW side).

A communication hole 32b, which allows the first space S1 to be continuous with the interior of the second duct 62, is formed in the first lid 32. A communication hole 32c, which allows the second space S2 to be continuous with the interior of the third duct 63, is formed in the first lid 32.

The second lid 33 is connected to an end of the flow passage 31 that is the end on the other side in the rotational axis direction DR (−DR side), that is, the end opposite the end to which the first lid 32 is connected to the flow passage 31. The second lid 33 has the shape of a rectangular parallelepiped box elongated in the width direction DW, as shown in FIG. 5. The other end of each of the pipes 31a in the rotational axis direction DR is open in the second lid 33. The interior of the second lid 33 is not partitioned, unlike the interior of the first lid 32. The interior of the second lid 33 is continuous with the first space S1 and the second space S2 in the first lid 32 via the interior of the pipes 31a of the flow passage 31. The second lid 33 is connected to the refrigerant sender 50. The heat exchanger 30 is thus connected to the refrigerant sender 50. In FIG. 5, a wall of the second lid 33 that is the wall located on the other side in the rotational axis direction DR is omitted.

The first duct 61 is a duct through which the air AR2 delivered from the first air blower 60 flows toward the moisture absorbing/discharging member 40, as shown in FIG. 3. In the present embodiment, the first duct 61 is located on one side of the moisture absorbing/discharging member 40 in the rotational axis direction DR (+DR side). The first duct 61 extends in the rotational axis direction DR and is open at the opposite ends thereof in the rotational axis direction DR. An end of the first duct 61 that is the end on the other side in the rotational axis direction DR (−DR side) faces via a gap a portion of the moisture absorbing/discharging member 40 that is the portion located in the first region F1. The air AR2 flows through the first duct 61 in the present embodiment from the one side in the rotational axis direction DR (+DR side) to the other side in the rotational axis direction DR (−DR side). Extensions 82, which will be described later, of the light modulation units 4R, 4G, and 4B are disposed in the first duct 61. FIG. 3 diagrammatically shows the extensions 82.

The second duct 62 is a duct through which the air AR2 having been delivered from the first air blower 60 and having passed through the moisture absorbing/discharging member 40 flows to the heat exchanger 30. The second duct 62 is located on the other side of the moisture absorbing/ discharging member 40 in the rotational axis direction DR (−DR side). The second duct 62 is located between the moisture absorbing/discharging member 40 and the heat exchanger 30 in the rotational axis direction DR.

The second duct 62 extends in the rotational axis direction DR and is open at the opposite ends thereof in the rotational axis direction DR. An end of the first duct 61 that is the end on the one side in the rotational axis direction DR (+DR side) faces via a gap a portion of the moisture absorbing/discharging member 40 that is the portion located in the first region F1. An end of the second duct 62 that is the end on the other side in the rotational axis direction DR (−DR side) is connected to the first lid 32. The interior of the second duct 62 communicates with the first space S1 via the communication hole 32b.

The third duct 63 is a duct through which the air AR2 exhausted from the heat exchanger 30 flows toward the moisture absorbing/discharging member 40. The third duct 63 is located on the other side of the moisture absorbing/discharging member 40 in the rotational axis direction DR (−DR side). The third duct 63 is located between the moisture absorbing/discharging member 40 and the heat exchanger 30 in the rotational axis direction DR. The third duct 63 is located on the other side in the width direction DW (−DW side) with respect to the second duct 62.

The third duct 63 extends in the rotational axis direction DR and is open at the opposite ends thereof in the rotational axis direction DR. An end of the third duct 63 that is the end on the one side in the rotational axis direction DR (+DR side) faces via a gap a portion of the moisture absorbing/discharging member 40 that is the portion located in the second region F2. An end of the third duct 63 that is the end on the other side in the rotational axis direction DR (−DR side) is connected to the first lid 32. The interior of the third duct 63 communicates with the second space S2 via the communication hole 32c.

The fourth duct 64 is a duct through which the air AR2 having been discharged from the heat exchanger 30 and having passed through the moisture absorbing/discharging member 40 flows. The fourth duct 64 is located on the one side of the moisture absorbing/discharging member 40 in the rotational axis direction DR (+DR side). The fourth duct 64 is located on the other side in the width direction DW (−DW side) with respect to the first duct 61.

The fourth duct 64 extends in the rotational axis direction DR and is open at the opposite ends thereof in the rotational axis direction DR. An end of the fourth duct 64 that is the end on the one side in the rotational axis direction DR (+DR side) opens toward an ambient environment OP outside the projector 1. An end of the fourth duct 64 that is the end on the other side in the rotational axis direction DR (−DR side) faces via a gap a portion of the moisture absorbing/discharging member 40 that is the portion located in the second region F2.

The heater 22 is disposed in the first duct 61. The heater 22 disposed in the first duct 61 is specifically disposed on the downstream of the extensions 82 (−DR side), which will be described later, of the light modulation units 4R, 4G, and 4B, which form the cooling target. The heater 22 is disposed on the one side, in the rotational axis direction DR (+DR side), of a portion of the moisture absorbing/discharging member 40 that is the portion located in the first region F1. The heater 22 is, for example, an electric heater. In the first duct 61, the heater 22 heats the air AR2 before delivered to a portion of the moisture absorbing/discharging member 40 that is the portion located in the first region F1.

The second air blower 28 is a blower that delivers air AR1 to the heat exchanger 30 to cool the heat exchanger 30. In the present embodiment, the second air blower 28 is located on one side of the heat exchanger 30 in the width direction DW (+DW side) and delivers the air AR1 toward the other side of the heat exchanger 30 in the width direction DW (−DW side). The air AR1 delivered from the second air blower 28 is sprayed against the outer surface of the flow passage 31. The flow passage 31 is thus cooled by the air AR1.

The cooling duct 21 is a duct that guides the air AR1 delivered from the second air blower 28 to the flow passage 31 of the heat exchanger 30. In the present embodiment, the cooling duct 21 extends in the width direction DW and is open at the opposite ends thereof in the width direction DW. The flow passage 31 of the heat exchanger 30 is so disposed in the cooling duct 21 as to pass through the cooling duct 21 in the rotational axis direction DR. The flow passage 31 is thus disposed in the cooling duct 21. The air AR1 flowing through the interior of the cooling duct 21 is therefore sprayed against the outer surface of the flow passage 31.

The air AR2 delivered from the first air blower 60 flows through along the first duct 61, passes by the extensions 82, which will be described later, of the light modulation units 4R, 4G, and 4B, which form the cooling target, and the heater 22 in this order, and is delivered to a portion of the moisture absorbing/discharging member 40 that is the portion located in the first region F1. Although will be described later in detail, the refrigerant W vaporizes at the extensions 82, and the air AR2 having passed by the extension 82 therefore contains the refrigerant W having been transformed into a gas. The first air blower 60 thus delivers the air AR2 containing the refrigerant W having been transformed into a gas at the cooling target to a portion of the moisture absorbing/discharging member 40 that is the portion located in the first region F1. In the present embodiment, the air AR2 delivered by the first air blower 60 to a portion of the moisture absorbing/discharging member 40 that is the portion located in the first region F1 contains water vapor into which the refrigerant W has vaporized and water vapor contained in the air taken from the ambient environment outside the projector 1. In the following description, the air AR2 containing the refrigerant W having vaporized at the extensions 82 is called air AR4 in some cases. In the present embodiment, the heater 22 heats the air AR4.

The air AR2 (air AR4) delivered to a portion of the moisture absorbing/discharging member 40 that is the portion located in the first region F1 has been heated by the heater 22 and therefore has a relatively high temperature. The air AR2 passing through a portion of the moisture absorbing/discharging member 40 that is the portion located in the first region F1 causes moisture absorbed by the moisture absorbing/discharging member 40 to vaporize, and the moisture having vaporized is discharged into the air AR2.

In a case where the moisture absorbing/discharging member 40 has absorbed no moisture, for example, when the projector 1 is used for the first time, no moisture is discharged into the air AR2 passing through a portion of the moisture absorbing/discharging member 40 that is the portion located in the first region F1.

The air AR2 having passed through a portion of the moisture absorbing/discharging member 40 that is the portion located in the first region F1 flows through the second duct 62 into the first space s1 of the heat exchanger 30 via the communication hole 32b. The air AR2 having passed through a portion of the moisture absorbing/discharging member 40 that is the portion located in the first region F1 thus flows into the heat exchanger 30.

The air AR2 having flowed into the first space S1 flows into the second lid 33 via the flow passage 31. In more detail, the air AR2 having flowed into the first space S1 passes through the interior of the pipes 31a continuous with the first space S1 out of the plurality of pipes 31a to the other side in the rotational axis direction DR (−DR side) and flows into the second lid 33. The air AR2 having flowed into the second lid 33 flows into the second space S2 of the interior of the first lid 32 via the flow passage 31 again. In more detail, the air AR2 having flowed into the second lid 33 flows through the interior of the pipes 31a continuous with the second space S2 out of the plurality of pipes 31a to the one side in the rotational axis direction DR (+DR side) and flows into the second space S2.

The flow passage 31 is externally cooled by the air AR1 flowing along the width direction DW through the cooling duct 21. When the flow passage 31 is cooled, the air AR2 flowing through part of the pipes 31a and having a relatively high temperature is cooled, so that the water vapor contained in the air AR2 condenses into water in the form of liquid, that is, the refrigerant W. The heat exchanger 30, when cooled, thus generates the refrigerant W from the air AR2 having flowed into the heat exchanger 30.

The air AR2 having flowed into the second space S2 is exhausted from the heat exchanger 30 via the communication hole 32c. The air AR2 exhausted from the heat exchanger 30 via the communication hole 32c is delivered through the third duct 63 to a portion of the moisture absorbing/discharging member 40 that is the portion located in the second region F2. That is, the air AR2 exhausted from the heat exchanger 30 is delivered to a portion of the moisture absorbing/discharging member 40 that is the portion located in the second region F2 different from the first region F1.

The air AR2 exhausted from the heat exchanger 30 is the air after cooled in the heat exchanger 30 so that part of the water vapor in the air condenses into the refrigerant W and therefore has a relatively low temperature and has a humidity of 100% or nearly 100%. When the air AR2 in this state is delivered to a portion of the moisture absorbing/discharging member 40 that is the portion located in the second region F2, the water vapor left in the air AR2 preferably tends to be absorbed by the moisture absorbing/discharging member 40. In the present embodiment, the water vapor left in the air AR2 after exhausted from the heat exchanger 30 is entirely or substantially entirely absorbed by the moisture absorbing/discharging member 40 when the air AR2 passes through a portion of the moisture absorbing/discharging member 40 that is the portion located in the second region F2.

A portion of the moisture absorbing/discharging member 40 that is the portion having absorbed the water vapor from the air AR2 in the second region F2 moves from the second region F2 to the first region F1 when the motor 24 rotates the moisture absorbing/discharging member 40. The water vapor absorbed by the moisture absorbing/discharging member 40 in the second region F2 is thus discharged into the air AR2 passing toward the heat exchanger 30 through a portion of the moisture absorbing/discharging member 40 that is the portion located in the first region F1.

The air AR2 having passed through a portion of the moisture absorbing/discharging member 40 that is the portion located in the second region F2 is exhausted through the fourth duct 64 to the ambient environment OP outside the projector 1. The air AR2 exhausted through the fourth duct 64 to the ambient environment OP outside the projector 1 is dry air AR5, from which the entire or substantially entire water vapor has been absorbed by the moisture absorbing/discharging member 40.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, a third catcher 53, and a connector 54, as shown in FIG. 5.

The first catcher 51 is fixed to an edge portion of an inner surface of the first lid 32 that is the inner surface facing the one side in the rotational axis direction DR (+DR side). The first catcher 51 has a thin-band-like shape and is formed in a rectangular-frame-like shape extending along the edge portion of the first lid 32. The second catcher 52 is fixed to an edge portion of an inner surface of the second lid 33 that is the inner surface facing the other side in the rotational axis direction DR (−DR side). The second catcher has a thin-band-like shape and is formed in a rectangular-frame-like shape extending along the edge portion of the second lid 33.

The third catcher 53 extends from the first catcher 51, passes through a pipe 31a, and reaches the second catcher 52, so that the third catcher 53 connects the first catcher 51 to the second catcher 52. The third catcher 53 has a thin-band-like shape extending in the rotational axis direction DR. In the present embodiment, the third catcher 53 is disposed in one of the plurality of pipes 31a, as shown in FIG. 5, but not necessarily. The third catcher 53 may be provided in each of part of the plurality of pipes 31a or may be provided in each of the plurality of pipes 31a. When the third catcher 53 is provided in each of part of the plurality of pipes 31, the third catchers 53 may be provided in two or more pipes 31a.

Figure 6:
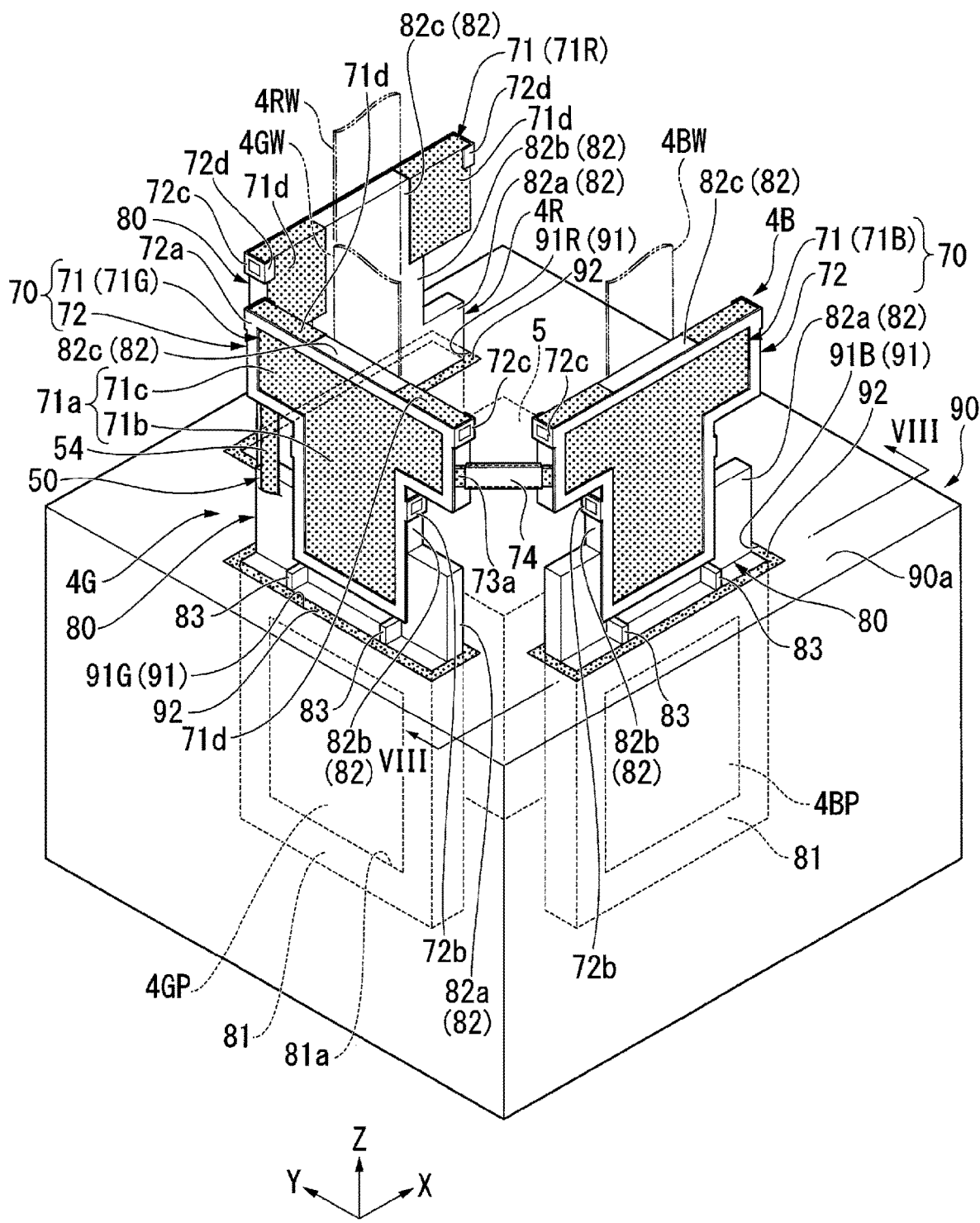
FIG. 6 is a perspective view showing light modulation units, a light combining system, and a dustproof enclosure in the first embodiment.

The connector 54 is a portion that connects the refrigerant generator 20 to the cooling target. In the present embodiment, the connector 54 is connected to the second catcher 52, extends from the interior of the second lid 33, passes through the outer wall of the second lid 32, and protrudes out of the second lid 33. The connector 54, which protrudes out of the second lid 33, extends to the light modulation unit 4G, which is part of the cooling target, as shown in FIG. 6. FIG. 6 is a perspective view showing the light modulation units 4R, 4G, and 4B, the light combining system 5, and a dustproof enclosure 90, which will be described later. The connector 54 has a thin-band-like shape. The width of the connector 54 is, for example, greater than the width of the first catcher 51, the width of the second catcher 52, and the width of the third catcher 53.

The light modulation units 4R, 4G, and 4B, which form the cooling target in the present embodiment, will next be described in more detail. In the following description, an upward/downward direction Z, with the positive side thereof being the upper side and the negative side being the lower side thereof, is drawn as appropriate in the form of an axis Z in the drawings. The direction parallel to an optical axis AX of a projection lens of the projection optical apparatus 6 that is the projection lens closest to the light exiting side, that is, the direction parallel to the projection direction of the projection optical apparatus 6 is called an "optical axis direction X" and drawn as appropriate in the form of an axis X in the drawings. The optical axis direction X is perpendicular to the upward/downward direction Z. The direction perpendicular both to the optical axis direction X and the upward/downward direction Z is called a "lateral direction Y" and drawn as appropriate in the form of an axis Y in the drawings.

The upward/downward direction Z, the lateral direction Y, and the upper and lower sides are merely names for describing the relative positional relationship among the portions of the projector, and the actual arrangement and other factors of the portions may differ from the arrangement and other factors indicated by the names. The present embodiment will be described with reference to a case where the upward/downward direction Z coincides with the vertical direction.

The light modulation units 4R, 4G, and 4B, which form the cooling target, are so disposed as to surround the light combining system 5, as shown in FIG. 6. The light modulation units 4R and 4B are so disposed on the opposite sides of the light combining system 5 as to sandwich the light combining system 5 in the lateral direction Y. The light modulation units 4R and 4B are so disposed as to be symmetrical in the lateral direction Y. The light modulation unit 4G is disposed on the light incident side of the light combining system 5 in the optical axis direction X (−X side). The attitude of the light modulation unit 4G is the attitude of the light modulation unit 4R rotated counterclockwise by 90° when viewed from above.

In the light modulation unit 4R, the direction in which the light passes through the light modulator 4RP coincides with the lateral direction Y. In the light modulation unit 4R, the positive side in the lateral direction Y (+Y side) is the light incident side on which the light is incident on the light modulator 4RP, and the negative side in the lateral direction Y (−Y side) is the light exiting side via which the light exits out of the light modulator 4RP.

In the light modulation unit 4G, the direction in which the light passes through the light modulator 4GP coincides with the optical axis direction X. In the light modulation unit 4G, the negative side in the optical axis direction X (−X side) is the light incident side on which the light is incident on the light modulator 4GP, and the positive side in the optical axis direction X (+X side) is the light exiting side via which the light exits out of the light modulator 4GP.

In the light modulation unit 4B, the direction in which the light passes through the light modulator 4BP coincides with the lateral direction Y. In the light modulation unit 4B, the negative side in the lateral direction Y (−Y side) is the light incident side on which the light is incident on the light modulator 4BP, and the positive side in the lateral direction Y (+Y side) is the light exiting side via which the light exits out of the light modulator 4BP.

The light modulation units 4R, 4G, and 4B and cooling facilitators 70, which will be described later and are provided in the light modulation units 4R, 4G, and 4B, are disposed in different positions and take different attitudes but have the same shape. Therefore, in the following description, only the light modulation unit 4G and the cooling facilitator 70 provided in the light modulation unit 4G will therefore be representatively described below in some cases unless otherwise stated.

The light modulation units 4R, 4G, 4B include holding frames 80, which hold the light modulators 4RP, 4GP, and 4BP. The holding frames 80 of the light modulation units 4R, 4G, 4B are disposed in different positions and take different attitudes in accordance with where the light modulation units 4R, 4G, 4B are disposed and the attitudes thereof but have the same shape.

The holding frame 80 provided in the light modulation unit 4G has a flat shape in the optical axis direction X, in which the light passes through the light modulator 4GP, and is elongated in the upward/downward direction Z. The holding frames 80 each include a frame main body 81, an extension (cooled portion) 82, and supports 83. The frame main body 81 is a portion that holds the light modulator 4GP. The frame main body 81 has a rectangular frame-like shape having a through hole 81a, which passes through the frame main body 81 in the optical axis direction X. The light modulator 4GP is fit into the through hole 81a. The light modulator 4GP is thus held by the holding frame 80 with an outer circumferential portion of the light modulator 4GP held by the frame main body 81.

The extension 82 is a portion extending from the frame main body 81. In the present embodiment, the extension 82 extends upward from a portion of the upper end of the frame main body 81 that is a portion located on the light exiting side (+X side). The extension 82 is disposed above the light modulator 4GP in the vertical direction (axis-Z direction) (+Z side). The dimension of the extension 82 in the optical axis direction X is smaller than the dimension of the frame main body 81 in the optical axis direction X. In the present embodiment, the extension 82 is a cooled portion to which the refrigerant W is delivered from the refrigerant sender 50. That is, the light modulation units 4R, 4G, 4B, which correspond to the cooling target in the present embodiment, include the light modulators 4RP, 4GP, 4BP, which correspond to the cooling target main body in the present embodiment, and the extensions 82, which correspond to the cooled portion in the present embodiment.

The extension 82 is thermally connected to the light modulator 4GP, which is part of the cooling target main body, via the frame main body 81. In the present specification, a situation in which "targets are thermally connected to each other" may be a situation in which the targets are connected to each other with heat transferrable between the targets. That is, the heat of the light modulator 4GP is transferrable to the extension 82 via the frame main body 81.

The extension 82 includes a first part 82a, a second part 82b, and a third part 82c. The first part 82a, the second part 82b, and the third part 82c are continuous with each other in this order from below toward above. The first part 82a, the second part 82b, and the third part 82c each have the shape of a rectangular parallelepiped elongated in the lateral direction Y, which is perpendicular both to the upward/downward direction Z and the optical axis direction X, in which the light passes through the light modulator 4GP.

The dimension of the first part 82a in the lateral direction Y is equal to the dimension of the frame main body 81 in the lateral direction Y. The dimension of the second part 82b in the lateral direction Y is smaller than the dimension of the first part 82a in the lateral direction Y. The dimension of the third part 82c in the lateral direction Y is greater than the dimension of the first part 82a in the lateral direction Y and the dimension of the second part 82b in the lateral direction Y. The third part 82c protrudes beyond the second part 82b toward the opposite sides in the lateral direction Y.

The supports 83 protrude from the first part 82a of the extension 82 toward the light incident side (−X side). The supports 83 pair with a distance therebetween in the lateral direction Y. The lower end of each of the supports 83 is connected to the upper surface of the frame main body 81. The supports 83 support a refrigerant holder 71 and fixing members 72, which will be described later, from below.

In the present embodiment, the holding frames 80 are made of metal. The material of the holding frames 80 contains, for example, aluminum. In the present embodiment, the thermal conductivity of the holding frames 80 is higher than the thermal conductivity of the refrigerant sender 50. The thermal conductivity of the holding frames 80 is, for example, greater than or equal to 80 [W/(m·K)]. The material of the holding frame 80 is not limited to a specific material and may contain copper and any other metal.

In the present embodiment, the projector 1 further includes the cooling facilitator 70 provided in each of the light modulation units 4R, 4G, and 4B, which form the cooling target. The cooling facilitators 70 each include the refrigerant holder 71 and the fixing member 72. The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 7:
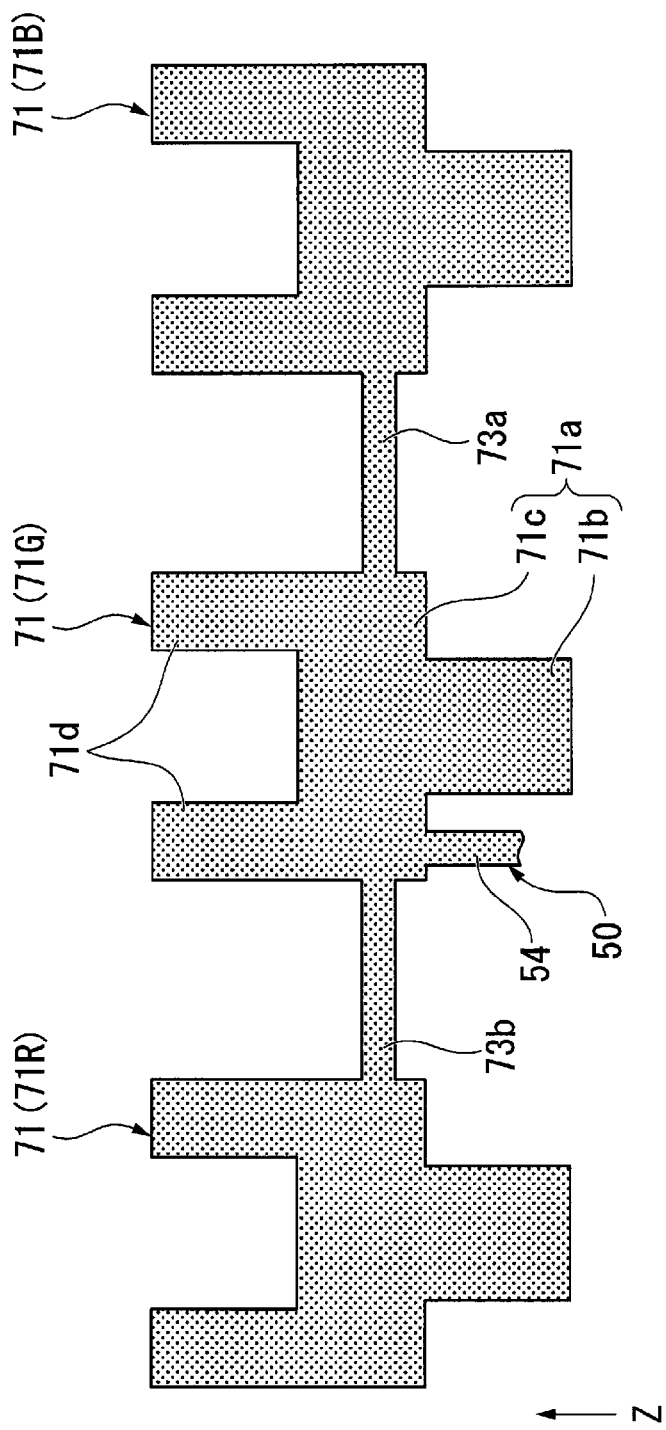
FIG. 7 shows a refrigerant holder in the first embodiment.

The refrigerant holder 71 is provided on surfaces of the extensions 82, which form the cooled part. In the present embodiment, the refrigerant holder 71 is so provided as to extend over the opposite surfaces of the extensions 82 in the direction in which the light passes through the light modulators 4RP, 4GP, and 4BP. FIG. 7 shows the refrigerant holder 71. A refrigerant holder 71R provided in the light modulation unit 4R, a refrigerant holder 71G provided in the light modulation unit 4G, and a refrigerant holder 71B provided in the light modulation unit 4B have the same shape, as shown in FIG. 7. The shape of the refrigerant holder 71G will be representatively described below.

The refrigerant holder 71G includes a main body 71a and a pair of folded parts 71d. The main body 71a is provided on the light incident side (−X side) of the extension 82, as shown in FIG. 6. The main body 71a includes a narrow part 71b and a wide part 71c.

In the present embodiment, the narrow part 71b has a rectangular shape. The narrow part 71b is so provided as to extend over the light-incident-side (−X-side) surface of the first part 82a and the light-incident-side surface of the second part 82b of the extension 82. The narrow part 71b covers a portion of the light-incident-side surface of the first part 82a that is a central portion thereof in the lateral direction Y and the entire light-incident-side surface of the second part 82b.

In the present embodiment, the wide part 71c has a rectangular shape. The wide part 71c is continuous with an upper portion of the narrow part 71b. The wide part 71c protrudes beyond the narrow part 71b toward the opposite sides in the lateral direction Y. The wide part 71c is provided on the light-incident-side (−X-side) surface of the third part 82c of the extension 82. The wide part 71c covers the entire light-incident-side surface of the third part 82c.

The pair of folded parts 71d are provided at portions of the upper end of the wide part 71c that are opposite end portions in the lateral direction Y. The pair of folded parts 71d extend along the upper side of the extension 82 and are so folded back as to cover the light exiting side (+X side) of the extension 82. The pair of folded parts 71d are so provided as to extend over surfaces of the extension 82 that are the upper surface of the third part 82c and the light-exiting-side surface of the third part 82c. The pair of folded parts 71d cover surfaces of the upper surface of the third part 82c that are opposite end portions in the lateral direction Y and surfaces of the light-exiting-side surface of the third part 82c that are opposite end portions in the lateral direction Y.

The refrigerant holder 71G provided in the light modulation unit 4G out of the refrigerant holder 71 provided in the light modulation units 4R, 4G, and 4B is connected to the refrigerant sender 50, as shown in FIG. 7. In more detail, the connector 54 of the refrigerant sender 50 is connected to the lower end of the wide part 71c of the refrigerant holder 71G. On the other hand, the connector 54 is not connected to the refrigerant holder 71B attached to the light modulation unit 4B or the refrigerant holder 71R attached to the light modulation unit 4R.

In the present embodiment, linkage parts 73a and 73b are provided and link the refrigerant holder 71B attached to the light modulation unit 4B and the refrigerant holder 71R attached to the light modulation unit 4R to the opposite sides of the refrigerant holder 71G attached to the light modulation unit 4G. The linkage parts 73a and 73b are each formed of a porous member.

The linkage part 73a links the refrigerant holder 71G attached to the light modulation unit 4G to the refrigerant holder 71B attached to the light modulation unit 4B. In more detail, the linkage part 73a links the wide part 71c of the refrigerant holder 71G and the wide part 71c of the refrigerant holder 71B to each other. The refrigerant holder 71B is thus connected to the connector 54 of the refrigerant sender 50 via the refrigerant holder 71G. The linkage part 73a is provided with a coating 74, with which the linkage part 73a is covered, as shown in FIG. 6. The coating 74 is, for example, a film made of resin.

The linkage part 73b links the refrigerant holder 71G attached to the light modulation unit 4G to the refrigerant holder 71R attached to the light modulation unit 4R, as shown in FIG. 7. In more detail, the linkage part 73b links the wide part 71c of the refrigerant holder 71G and the wide part 71c of the refrigerant holder 71R to each other. The refrigerant holder 71R is thus connected to the connector 54 of the refrigerant sender 50 via the refrigerant holder 71G. Although not shown, the linkage part 73b is similarly provided with a coating 74, as is the linkage part 73a.

The fixing members 72 are members that fix the refrigerant holders 71 as shown in FIG. 6. The fixing members 72 provided in the light modulation units 4R, 4G, and 4B have the same shape, and the fixing member 72 that fixes the refrigerant holder 71G provided in the light modulation unit 4G will therefore be representatively described below.

The fixing member 72 is a plate-shaped member. The fixing member 72 is made, for example, of metal. The fixing member 72 includes a frame part 72a and attachment parts 72b and 72c. The frame part 72a is located on the light incident side (−X side) of the main body 71a of the refrigerant holder 71. The frame part 72a covers an outer edge portion of the main body 71a. The frame part 72a has the same outer shape as the outer shape of the main body 71a.

The extension 82, the main body 71a of the refrigerant holder 71, and the frame part 72a are superimposed on each other in the direction in which the light passes through the light modulation unit 4G (optical axis direction X). In the following description, the direction in which the extension 82, the main body 71a of the refrigerant holder 71, and the frame part 72a are superimposed on each other is simply called a "superimposing direction." The fixing member 72 fixes the main body 71a of the refrigerant holder 71 in such a way that the refrigerant holder 71 is sandwiched between the frame part 72a and the extension 82, which is the cooled part, in the superimposing direction (optical axis direction X).

In the present embodiment, at least part of the refrigerant holder 71 is exposed when viewed from the side facing the fixing member 72 in the superimposing direction (light incident side). In more detail, a portion of the main body 71*a* of the refrigerant holder 71 that is the portion located inside the frame part 72*a* is exposed when viewed from the side facing the fixing member 72 in the superimposing direction.

The attachment parts 72*b* are provided at opposite ends of a lower portion of the frame part 72*a* that are opposite ends in the lateral direction Y. The attachment parts 72*c* are provided at opposite ends of an upper portion of the frame part 72*a* that are opposite ends in the lateral direction Y. The attachment parts 72*b* and 72*c* protrude from the frame part 72*a* toward the light exiting side (+X side). The attachment parts 72*b* engage with protrusions provided on the side surfaces of the second part 82*b* of the holding frame 80. The attachment parts 72*c* engage with protrusions provided on the side surfaces of the third part 82*c* of the holding frame 80. The fixing member 72 is thus fixed to the holding frame 80. A front end portion of each of the attachment parts 72*c* is a hook 72*d*, which is so bent as to press the pair of folded parts 71*d* from the light exiting side. FIG. 6 shows the hooks 72*d* of the fixing member 72 provided in the light modulation unit 4R.

The light modulation unit 4R includes a wiring line 4RW electrically connected to the light modulator 4RP. The light modulation unit 4G includes a wiring line 4GW electrically connected to the light modulator 4GP. The light modulation unit 4B includes a wiring line 4BW electrically connected to the light modulator 4BP. The wiring lines 4RW, 4GW, and 4BW extend in the upward/downward direction Z on the light exiting side of the extensions 82 and are drawn upward beyond the extensions 82. The wiring lines 4RW, 4GW, and 4BW are so disposed as to face portions of the light-exiting-side surfaces of the extensions 82 of the holding frames 80 that are the portions where the pair of folded parts 71*d* are provided.

Figure 8:
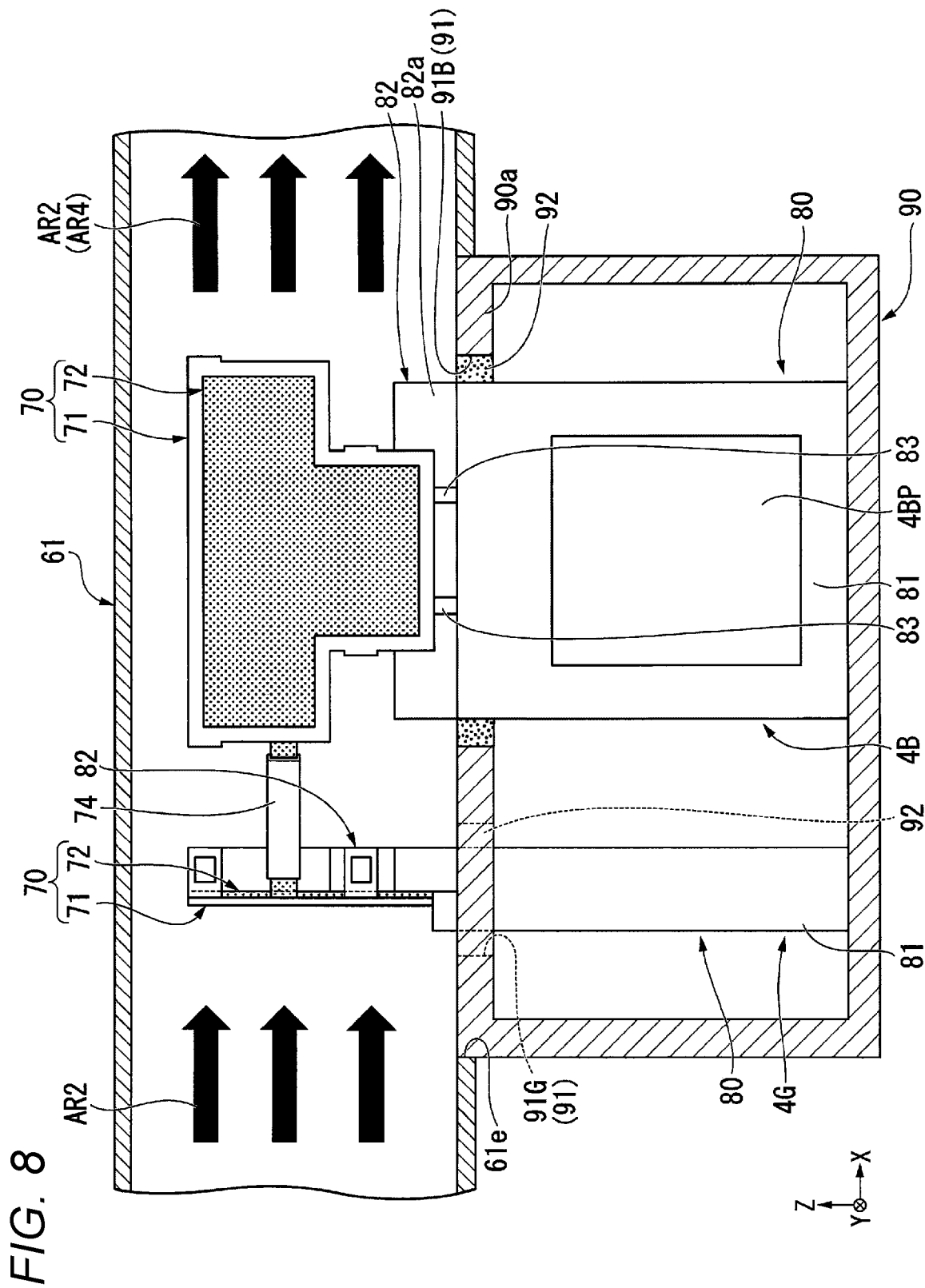
FIG. 8 is a cross-sectional view showing light modulation units, a dustproof enclosure, and part of a first duct in the first embodiment and is the cross-sectional view taken along the line VIII-VIII in FIG. 6.

The projector 1 further includes the dustproof enclosure 90, which accommodates at least part of the cooling targets, as shown in FIG. 8. FIG. 8 is a cross-sectional view showing the light modulation units 4B and 4G, the dustproof enclosure 90, and part of the first duct 61 in the present embodiment and is the cross-sectional view taken along the line VIII-VIII in FIG. 6.

The dustproof enclosure 90 has, for example, the shape of a rectangular parallelepiped box, as shown in FIGS. 6 and 8. The dustproof enclosure 90 has dustproofness. The dustproof enclosure 90 is closed and capable of blocking entry of dust, dirt, and other foreign substances in the ambient environment into the dustproof enclosure 90.

In the present specification, a case where "a target has dustproofness" includes a case where the target is so characterized as not or substantially not to transmit dust, dirt, or other foreign substances. The case where "the target is so characterized as substantially not to transmit dust, dirt, or other foreign substances" includes a case where the target is so characterized as to be capable of blocking at least 90% of dust, dirt, and other foreign substances that attempt to pass through the target.

In the present embodiment, the dustproof enclosure accommodates the light combining system 5, the light modulators 4RP, 4GP, and 4BP, and the frame main bodies 81, which hold the light modulators 4RP, 4GP, and 4BP, as shown in FIG. 6. That is, the light modulators 4RP, 4GP, and 4BP, which form the cooling target main body, are disposed in the dustproof enclosure 90.

The dustproof enclosure 90 is provided with through holes 91, through which the holding frames 80 pass. In the present embodiment, the through holes 91 are provided in a top wall 90*a*, which is located on the upper side, out of the walls that form the dustproof enclosure 90, which has the shape of a rectangular parallelepiped. The through holes 91 pass through the top wall 90*a* in the upward/downward direction Z. The through holes 91 are each, for example, a rectangular hole. In the present embodiment, the through holes 91 are formed of a plurality of through holes. The through holes 91 are formed, for example, of three through holes 91R, 91G, and 91B.

The holding frames 80, which hold the light modulation units 4R, 4G, and 4B, pass through the three through holes 91R, 91G, and 91B, respectively. The extensions 82 provided in the light modulation units 4R, 4G, and 4B protrude upward beyond the dustproof enclosure 90 through the through holes 91R, 91G, and 91B. The extensions 82, which form the cooled part, are thus disposed outside the dustproof enclosure 90. Upper end portions of the frame main bodies 81 of the holding frames 80 are inserted into the through holes 91, as shown in FIG. 8.

In the present embodiment, a seal member 92 is provided between each of the through holes 91 and the corresponding holding frame 80. The sealing member 92 fills the space between the inner surface of the through hole 91 and the outer surface of the holding frame 80. In the present embodiment, the seal member 92 fills the space between the inner surface of the through hole 91 and the outer surface of the upper end portion of the frame main body 81. The seal member 92 is preferably made of a relatively soft material. The reason for this is that a soft seal member 92 is unlikely to exert force to the holding frame 80 inserted into the through hole 91. The seal member 92 may be made, for example, of sponge or gel.

The first duct 61 is disposed above the dustproof enclosure 90. The top wall 90*a* of the dustproof enclosure 90 is fit into a hole 61*e*, which is provided in the lower wall of the first duct 61. In FIG. 8, the direction in which the first duct 61 extends is, for example, the optical axis direction X. That is, FIG. 8 shows a case where the rotational axis direction DR is parallel to the optical axis direction X by way of example.

The extensions 82 in the plurality of light modulation units 4R, 4G, and 4B and the cooling facilitators 70 provided at the extensions 82 are disposed in the first duct 61. That is, the extensions 82, which form the cooled part, are disposed in the first duct 61 outside the dustproof enclosure 90. In the present embodiment, the air AR2 from the first air blower 60 flows through the interior of the first duct 61 from the light incident side in the optical axis direction X (−X side) of the light combining system 5 toward the light exiting side therein (+X side). The air AR2 flowing through the interior of the first duct 61 is sprayed against the plurality of extensions 82 and the plurality of cooling facilitators 70. The first air blower 60 thus delivers the air AR2 to the extensions 82, which form the cooled part.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage part 73*a* and to the refrigerant holder 71R via the linkage part 73*b*. The refrigerant W generated by the refrigerant generator 20 is thus sent to the three light modulation units 4R, 4G, and 4B. The refrigerant W sent to and held by the refrigerant holder 71 then vaporizes to cool the light modulation units 4R, 4G, and 4B, which form the cooling target. In more detail, the refrigerant W held by the refrigerant holder 71 vaporizes to cool the extensions 82, which form the cooled part, and the frame main bodies 81 and the light modulators 4RP, 4GP, and 4BP thermally connected to the extensions 82 via the frame main bodies 81 are therefore cooled. The cooler 10 can thus cool the light modulation units 4R, 4G, and 4B, which form the cooling target.

In the present embodiment, the refrigerant W vaporizes at the plurality of extensions 82 and the plurality of cooling facilitators 70 accommodated in the first duct 61, as described above. Therefore, out of the air AR2 flowing through the interior of the first duct 61, the air AR2 after passing by the plurality of extensions 82 and the plurality of cooling facilitators 70 becomes the air AR4 containing the refrigerant W having vaporized.

According to the present embodiment, the cooler 10 can cool the cooling target by sending the refrigerant W generated by the refrigerant generator 20 to the cooling target via the refrigerant sender 50 and using vaporization of the refrigerant W, which is an endothermic reaction, to draw heat from the cooling target. The cooling based on the vaporization of the refrigerant W can actively draw heat from the cooling target and therefore provides excellent cooling performance as compared with air cooling and liquid cooling, in which a cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore causes no increase in noise produced by the cooler 10. The present embodiment therefore provides a projector 1 including a cooler 10 that excels in cooling performance, has a compact size, and excels in quietness.

According to the present embodiment, in which the refrigerant generator 20 can generate the refrigerant W, a user's convenience can be improved because the user does not need to replenish the projector 1 with the refrigerant W. Further, since the refrigerant generator 20 can perform adjustment in such a way that it generates the refrigerant W by a necessary amount as required, there is no need for storage of the refrigerant W, for example, in a storage tank, whereby the weight of the projector 1 can be reduced.

According to the present embodiment, the first air blower 60 is provided to deliver the air AR2 containing the refrigerant W having vaporized at the cooling target to a portion of the moisture absorbing/discharging member 40 that is the portion located in the first region F1, and the air AR2 having passed through a portion of the moisture absorbing/discharging member 40 that is the portion located in the first region F1 flows into the heat exchanger 30. The refrigerant W having vaporized at the cooling target can therefore be caused to flow into the heat exchanger 30 again. At least part of the refrigerant W having vaporized can thus be caused to condense again into the refrigerant W.

According to the present embodiment, the air AR2 exhausted from the heat exchanger 30 is delivered to a portion of the moisture absorbing/discharging member 40 that is the portion located in the second region F2 different from the first region F1. The air AR2 exhausted from the heat exchanger 30 has a relatively low temperature and has a humidity of 100% or nearly 100%, as described above. Therefore, the water vapor left in the air AR2 can be preferably discharged into the moisture absorbing/discharging member 40 when the air AR2 passes through the moisture absorbing/discharging member 40. The water vapor left in the air AR2 exhausted from the heat exchanger 30 can therefore be trapped by the moisture absorbing/discharging member 40, whereby a situation in which the water vapor is exhausted to the ambient environment OP outside the projector 1 can be suppressed. The moisture trapped by the moisture absorbing/discharging member 40 is delivered to the heat exchanger 30 again in the form of water vapor carried by the air AR2 passing through a portion of the moisture absorbing/discharging member 40 that is the portion located in the first region F1.

According to the present embodiment, the situation in which the refrigerant W having vaporized at the cooling target is exhausted, for example, to the ambient environment OP outside the projector 1 can thus be suppressed, but the water vapor can be preferably kept in the refrigerant generator 20. The refrigerant W having vaporized can thus be caused to condense again into the liquid refrigerant W, which can be delivered to the cooling target. That is, the water vapor having vaporized can be kept reused with no waste. The refrigerant generation efficiency of the refrigerant generator 20 can therefore be improved.

The temperature of the air AR2 passing through the moisture absorbing/discharging member 40 before flowing into the heat exchanger 30 needs to be relatively high in order to allow the moisture to be discharged into the air AR2 from the moisture absorbing/discharging member 40. To this end, when the temperature of the air AR2 is not high enough, the heater 22 needs to heat the air AR2 to increase the temperature thereof, as in the present embodiment.

In view of the fact described above, according to the present embodiment, the air AR2 containing the refrigerant W having vaporized at the cooling target is delivered to a portion of the moisture absorbing/discharging member 40 that is the portion located in the first region F1. Since the refrigerant W having vaporized at the cooling target has a relatively high temperature resulting from the heat of the cooling target, the air AR2 delivered by the first air blower 60 has a relatively high temperature. As a result, when the air AR2 is delivered to a portion of the moisture absorbing/discharging member 40 that is the portion located in the first region F1, moisture tends to be preferably discharged into the air AR2. Further, even when the temperature of the refrigerant W having vaporized at the cooling target alone is not high enough to cause the moisture absorbing/discharging member 40 to discharge moisture, the energy produced by the heater 22 and required to raise the temperature of the air AR2 can be lowered. The energy necessary for generation of the refrigerant W can therefore be lowered, whereby the refrigerant generation efficiency of the refrigerant generator 20 can be improved.

As described above, according to the present embodiment, the refrigerant W having vaporized at the cooling target can be reused as water vapor for generation of the refrigerant W again, and the heat generated when the refrigerant w vaporizes can also be used to generate the refrigerant W. The refrigerant generation efficiency of the refrigerant generator 20 can therefore be preferably improved.

When no refrigerant W has been generated and the moisture absorbing/discharging member 40 has absorbed no moisture, for example, when the projector 1 is used for the first time, the air AR2 delivered by the first air blower 60 to the heat exchanger 30 contains only water vapor contained in the air taken from the ambient environment outside the projector 1. In this case, part of the water vapor contained in the air taken from the ambient environment outside the projector 1 condenses in the heat exchanger 30 into the refrigerant W. Thereafter, when the air AR2 exhausted from the heat exchanger 30 is delivered to the moisture absorbing/discharging member 40, part of the remainder of the water vapor contained in the air taken from the ambient environment outside the projector 1 is discharged to the moisture absorbing/discharging member 40. The state in which the moisture absorbing/discharging member 40 has absorbed moisture is thus achieved. Thereafter, once the refrigerant W vaporizes at the cooling target, the air AR2 delivered from the first air blower 60 to the heat exchanger 30 contains the refrigerant W, and moisture is discharged from the moisture absorbing/discharging member 40.

Further, according to the present embodiment, the refrigerant generator 20 includes the heater 22, which heats the air AR2 before delivered to a portion of the moisture absorbing/discharging member 40 that is the portion located in the first region F1. Thus, the temperature of the air AR2 can be increased preferably. Therefore, when the air AR2 passes through the moisture absorbing/discharging member 40, the moisture absorbing/discharging member 40 can preferably discharge moisture into the air AR2. The air AR2 delivered by the first air blower 60 to the moisture absorbing/discharging member 40 contains the refrigerant W having vaporized and therefore has a relatively high temperature, as described above. The energy produced by the heater 22 and required to heat the air AR2 can therefore be relatively lowered.

Further, according to the present embodiment, the first air blower 60 delivers the air AR2 to the cooling target and delivers the air AR2 having delivered to the cooling target to a portion of the moisture absorbing/discharging member 40 that is the portion located in the first region F1. The air AR2 delivered from the first air blower 60 therefore tends to cause vaporization of the refrigerant W delivered to the light modulation units 4R, 4G, and 4B, which form the cooling target, whereby the light modulation units 4R, 4G, and 4B can be further cooled. In the present embodiment, the first air blower 60 delivers the air AR2 to the extensions 82, which form the cooled part, whereby the refrigerant W delivered to the extensions 82 are preferably allowed to vaporize. Further, delivering the air AR2 to the cooling targets allows the air AR2 to contain the refrigerant having vaporized. The air AR4 containing the refrigerant W having vaporized can therefore be readily delivered to the moisture absorbing/discharging member 40. Further, no air blower that delivers air to the cooling target needs to be provided separately from the first air blower 60. Therefore, an increase in the number of parts of the projector 1 can be suppressed, and an increase in noise produced by the projector 1 can be suppressed.

When the refrigerant W delivered to the cooling target vaporizes, the refrigerant W having vaporized relatively increases the humidity of the air around the cooling target. The air having the relatively high humidity therefore could affect the cooling target to cause a problem thereof. Specifically, when the cooling target is an optical element, the refrigerant W having vaporized at the cooling target could hinder the travel of the light that enters the optical element or the light that exits out of the optical element. The reliability of the projector could therefore lower.

In contrast, according to the present embodiment, the extensions 82, which form the cooled part, are disposed outside the dustproof enclosure 90. The refrigerant W delivered to the extensions 82 therefore vaporizes outside the dustproof enclosure 90. On the other hand, the light modulators 4RP, 4GP, and 4BP, which form the cooling target main body, are disposed in the dustproof enclosure 90. The dustproof enclosure 90 can thus suppress movement of the refrigerant W having vaporized outside the dustproof enclosure 90 to the region around the light modulators 4RP, 4GP, and 4BP. An increase in the humidity of the air around the light modulators 4RP, 4GP, and 4BP due to the refrigerant W having vaporized can thus be suppressed. Hinderance of the travel of the light that enters the light modulators 4RP, 4GP, and 4BP and the light that exits out of the light modulators 4RP, 4GP, and 4BP can therefore be suppressed. As described above, the present embodiment can suppress a situation in which the refrigerant W having vaporized causes a problem of the cooling target main body, whereby the reliability of the projector 1 can be improved.

Particularly, according to the present embodiment, the light modulation units 4R, 4G, and 4B form the cooling target, and the light modulators 4RP, 4GP, and 4BP form the cooling target main body. Therefore, a situation in which the light modulators 4RP, 4GP, and 4BP have a problem can be suppressed, and a situation in which the color image (video) outputted from the projector 1 has a problem, such as fluctuation, can be suppressed.

According to the present embodiment, the extensions 82, which form the cooled part are disposed in the first duct 61 outside the dustproof enclosure 90, and the air AR2 from the first air blower 60, which is the cooling air blower, flows into the first duct 61. The air AR2 delivered from the first air blower 60 can therefore be preferably delivered to the plurality of extensions 82. As a result, the vaporization of the refrigerant W can be preferably facilitated at the extensions 82, and the light modulators 4RP, 4GP, and 4BP, which form the cooling target, can be further cooled. Moreover, since the refrigerant W vaporizes in the first duct 61, the refrigerant W having vaporized can be preferably delivered to the heat exchanger 30 through the first duct 61.

According to the present embodiment, the dustproof enclosure 90 is provided with the through hole 91, through which the holding frames 80 pass, and the sealing member 92 is provided between the through hole 91 and the holding frames 80. Entry of foreign matter and the refrigerant W having vaporized into the dustproof enclosure 90 via the gap between the through hole 91 and the holding frames 80 can therefore be suppressed. The reliability of the projector 1 can thus be further improved.

In the present embodiment, the first air blower 60, which is an intake fan that takes the air in the ambient environment into the projector 1, is used to facilitate the vaporization of the refrigerant W delivered to the cooled part, as described above. The same cooling performance as that provided in a case where no cooler 10 in the present embodiment is provided and only delivered air cools a cooling target can therefore be provided even when the output of the first air blower 60 is lowered. The noise produced by the first air blower 60 can therefore be reduced by lowering the output of the first air blower 60, which is an intake fan, whereby the quietness of the projector 1 can be further improved.

According to the present embodiment, the holding frames 80, which hold the light modulators 4RP, 4GP, and 4BP, which form the cooling target main body, are made of metal. The heat of the light modulators 4RP, 4GP, and 4BP therefore tends to be transferred to the holding frames 80. Cooling the extensions 82, which form the cooled part, out of the holding frames 80 with the aid of the vaporization of the refrigerant W can further preferably cool the light modulators 4RP, 4GP, and 4BP, which form the cooling target main body.

According to the present embodiment, the material of the holding frames 80 contains aluminum. The holding frames 80 therefore tend to have relatively high thermal conductivity. The heat of the light modulators 4RP, 4GP, and 4BP thus tends to be transferred to the holding frames 80. Cooling the extensions 82, which form the cooled part, out of the holding frames 80 with the aid of the vaporization of the refrigerant W can further preferably cool the light modulators 4RP, 4GP, and 4BP, which form the cooling target main body.

According to the present embodiment, the thermal conductivity of the holding frames 80 is higher than the thermal conductivity of the refrigerant sender 50. The holding frames 80 therefore tend to have relatively high thermal conductivity. The heat of the light modulators 4RP, 4GP, and 4BP thus tends to be transferred to the holding frames 80. Cooling the extensions 82, which form the cooled part, out of the holding frames 80 with the aid of the vaporization of the refrigerant W can further preferably cool the light modulators 4RP, 4GP, and 4BP, which form the cooling target main body.

According to the present embodiment, the extensions 82, which form the cooled part, are provided with the refrigerant holder 71, which holds the refrigerant W. The refrigerant W sent to the extensions 82 can therefore be held at the extensions 82 by the refrigerant holder 71 until the refrigerant W vaporizes. The generated refrigerant W can thus be readily used with no waste, whereby the cooling performance of the cooler 10 can be further improved.

According to the present embodiment, the refrigerant holder 71 is attached to surfaces of the extensions 82, which form the cooled part, and is formed of a porous member. At least part of the refrigerant holder 71 is exposed when viewed from the side facing the refrigerant holder 71 in the superimposing direction. The refrigerant W therefore readily vaporizes via the exposed portion of the refrigerant holder 71, whereby the cooling performance of the cooler 10 can be further improved. Further, the refrigerant holder 71, which is formed of a porous member, readily uniformly distributes the refrigerant W across the surfaces of the cooled part, which is provided with the refrigerant holder 71, based on capillarity, whereby the cooling target is readily further cooled.

For example, when the refrigerant holder 71 is fixed to the extensions 82 with an adhesive, the pores in the refrigerant holder 71, which is formed of a porous member, are closed in some cases with the adhesive absorbed by the refrigerant holder 71. The refrigerant holder 71 is therefore unlikely to absorb or hold the refrigerant W in some cases.

In contrast, according to the present embodiment, the fixing members 72 are so provided as to fix the refrigerant holder 71 in such a way that the fixing members 72 and the extensions 82 sandwich the refrigerant holder 71. The refrigerant holder 71 can therefore be fixed to the extensions 82 with use of no adhesive. The situation in which the refrigerant holder 71 is unlikely to hold the refrigerant W can therefore be suppressed. Further, in the present embodiment, the fixing members 72 are made of metal. The fixing members 72 therefore have relatively high thermal conductivity and are hence likely to be cooled. The air AR2 from the first air blower 60 and the vaporization of the refrigerant W therefore readily lower the temperature of the fixing members 72, whereby the cooled part, which is in contact with fixing members 72, is readily further cooled.

According to the present embodiment, the refrigerant holder 71 is provided in the plurality of light modulation units 4R, 4G, and 4B, and the linkage part 73a, which links the two refrigerant holders 71G and 71B to each other, and the linkage part 73b, which links the two refrigerant holders 71G and 71R to each other, are provided. Connecting the refrigerant sender 50 to the single refrigerant holder 71 therefore allows the refrigerant W to be sent to the other portions of the refrigerant holder 71. The routing of the refrigerant sender 50 in the projector 1 can therefore be simplified.

According to the present embodiment, the linkage parts 73a and 73b are provided with the respective coatings 74, with which the linkage parts 73a and 73b are covered. A situation in which the refrigerant W that moves along the linkage parts 73a and 73b vaporizes via the linkage parts 73a and 73b can therefore be suppressed. A situation in which the refrigerant W vaporizes without contributing to the cooling of the light modulation units 4R, 4G, and 4B, which form the cooling target, can therefore be suppressed, whereby waste of the generated refrigerant W can be suppressed.

In the present embodiment, the connector 54 may also be coated, as are the linkage parts 73a and 73b. The configuration described above can suppress vaporization of the refrigerant W being sent to the cooling target. Therefore, the refrigerant W can be efficiently sent to the cooling target, and waste of the generated refrigerant W can be further suppressed. The circumference of each of the connector 54 and the linkage parts 73a and 73b may instead be coated, for example, with a tube. A coating treatment that suppresses the vaporization may still instead be performed on the surface of each of the connector 54 and the linkage parts 73a and 73b.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the second region F2 can preferably absorb water vapor from the air AR2, and a portion of the moisture absorbing/discharging member 40 that is the portion located in the first region F1 can preferably discharge moisture into the air AR2. The refrigerant W can therefore be efficiently generated.

According to the present embodiment, the refrigerant sender 50 sends the refrigerant W based on capillarity. No pump or any other power source for sending the refrigerant W therefore needs to be separately provided. An increase in the number of parts of the projector 1 can therefore be suppressed, whereby the size and weight of the projector 1 are each readily reduced by a greater amount.

According to the present embodiment, the refrigerant sender 50 includes the connector 54, which is formed of a porous member and connects the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is connected to the connector 54. The second catcher 52 can therefore absorb the refrigerant W accumulated in the second lid 33 and send the absorbed refrigerant W to the connector 54 based on capillarity. The generated refrigerant W is therefore readily delivered with no waste to the cooling target.

According to the present embodiment, the refrigerant sender 50 includes the first catcher 51, which is provided in the first lid 32, and the third catcher 53, which connects the first catcher 51 to the second catcher 52. The first catcher 51 can therefore absorb the refrigerant W having accumulated in the first lid 32 and send the absorbed refrigerant W to the second catcher 52 via the third catcher 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target.

According to the present embodiment, the third catcher 53 passes through a pipe 31a. The third catcher 53 can therefore absorb the refrigerant W having accumulated in the pipe 31a and send the absorbed refrigerant W to the cooling target via the second catcher 52 and the connector 54. The generated refrigerant W is therefore readily delivered with no waste to the cooling target.

According to the present embodiment, the width of the connector 54 is greater, for example, than the width of the first catcher 51, the width of the second catcher 52, and the width of the third catcher 53. The width of the connector 54 is therefore readily set at a relatively large value, whereby the amount of refrigerant W that can be sent by the connector 54 can be increased. The refrigerant sender 50 therefore readily delivers the refrigerant W to the cooling target, whereby the cooling target is readily further cooled.

On the other hand, the width of the first catcher 51, the width of the second catcher 52, and the width of the third catcher 53 are each readily set at a relatively small value. The amount of refrigerant W held by each of the first catcher 51, the second catcher 52, and the third catcher 53 can therefore be reduced. The amount of refrigerant W held by the first catcher 51, the second catcher 52, and the third catcher 53 and hence left in the heat exchanger 30 can therefore be reduced, whereby the generated refrigerant W is readily delivered with no waste to the cooling target.

Second Embodiment

Figure 9:
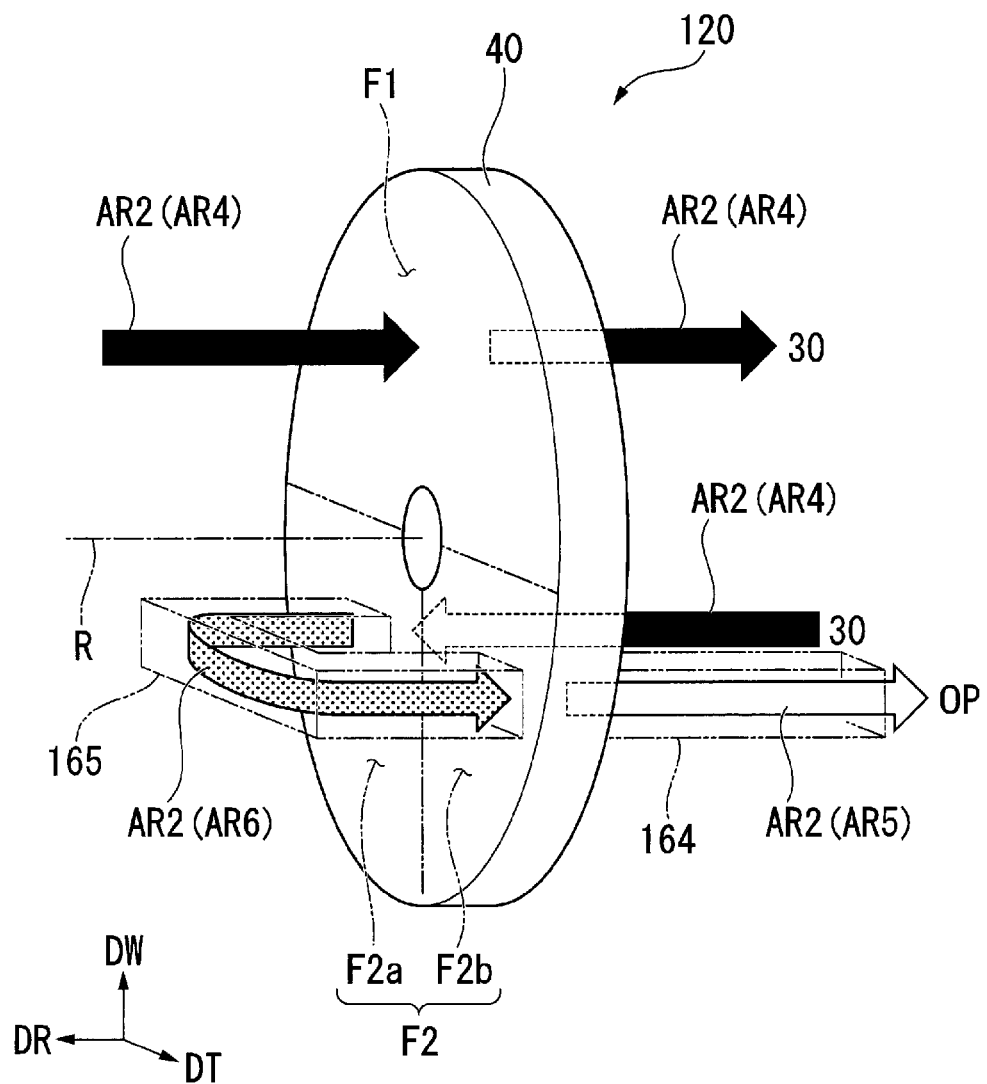
FIG. 9 is perspective view showing the flow of air flowing through a moisture absorbing/discharging member in a second embodiment.

The present embodiment differs from the first embodiment in terms of the flow of the air AR2 after exhausted from the heat exchanger 30. The same configurations as those in the embodiment described above have the same reference characters as appropriate or otherwise handled and will therefore not be described in some cases. FIG. 9 is perspective view showing the flow of the air AR2 flowing through the moisture absorbing/discharging member 40 in the present embodiment.

In a refrigerant generator 120 in the present embodiment, the air AR2 exhausted from the heat exchanger 30 passes multiple times through a portion of the moisture absorbing/discharging member 40 that is the portion located in the second region F2, as shown in FIG. 9. In more detail, the second region F2 has a first passage region F2a and a second passage region F2b. The air AR2 (air AR4) exhausted from the heat exchanger 30 passes through a portion of the moisture absorbing/discharging member 40 that is the portion located in the first passage region F2a of the second region F2 from the other side in the rotational axis direction DR (−DR side). The first passage region F2a is a region of the second region F2 that is the region located on the other side with respect to the rotational axis R in the thickness direction DT (−DT side). The air AR2 (air AR4) having passed through a portion of the moisture absorbing/discharging member 40 that is the portion located in the first passage region F2a becomes air AR6, from which part of the water vapor has been discharged into the moisture absorbing/discharging member 40.

The air AR6 having passed once through the moisture absorbing/discharging member 40 travels back through a fifth duct 165 in the rotational axis direction DR and passes through a portion of the moisture absorbing/discharging member 40 that is the portion located in the second passage region F2b of the second region F2 from the one side in the rotational axis direction DR (+DR side). The second passage region F2b is a region of the second region F2 that is the region located on the one side with respect to the rotational axis R in the thickness direction DT (+DT side). The air AR6 having passed through a portion of the moisture absorbing/discharging member 40 that is the portion located in the second passage region F2b becomes the dry air AR5, from which the remaining water vapor has been discharged into the moisture absorbing/discharging member 40, and the dry air AR5 is exhausted via a fourth duct 164 to the ambient environment OP outside the projector 1. As described above, in the present embodiment, the air AR2 exhausted from the heat exchanger 30 passes twice through a portion of the moisture absorbing/discharging member 40 that is the portion located in the second region F2.

In the present embodiment, the fourth duct 164, which guides the air AR2 to the ambient environment OP outside the projector 1 is located on the other side of the moisture absorbing/discharging member 40 in the rotational axis direction DR (−DR side). The fifth duct 165, through which the air AR6 having passed once through the moisture absorbing/discharging member 40 is delivered to the moisture absorbing/discharging member 40 again, is located on the one side of the moisture absorbing/discharging member 40 in the rotational axis direction DR (+DR side).

The other configurations of the refrigerant generator 120 are the same as the configurations of the refrigerant generator 20 in the first embodiment.

According to the present embodiment, the air AR2 exhausted from the heat exchanger 30 passes multiple times through a portion of the moisture absorbing/discharging member 40 that is the portion located in the second region F2. The water vapor left in the air AR2 exhausted from the heat exchanger 30 can therefore be more reliably discharged into the moisture absorbing/discharging member 40. The refrigerant generation efficiency of the refrigerant generator 120 can therefore be further improved.

Third Embodiment

Figure 10:
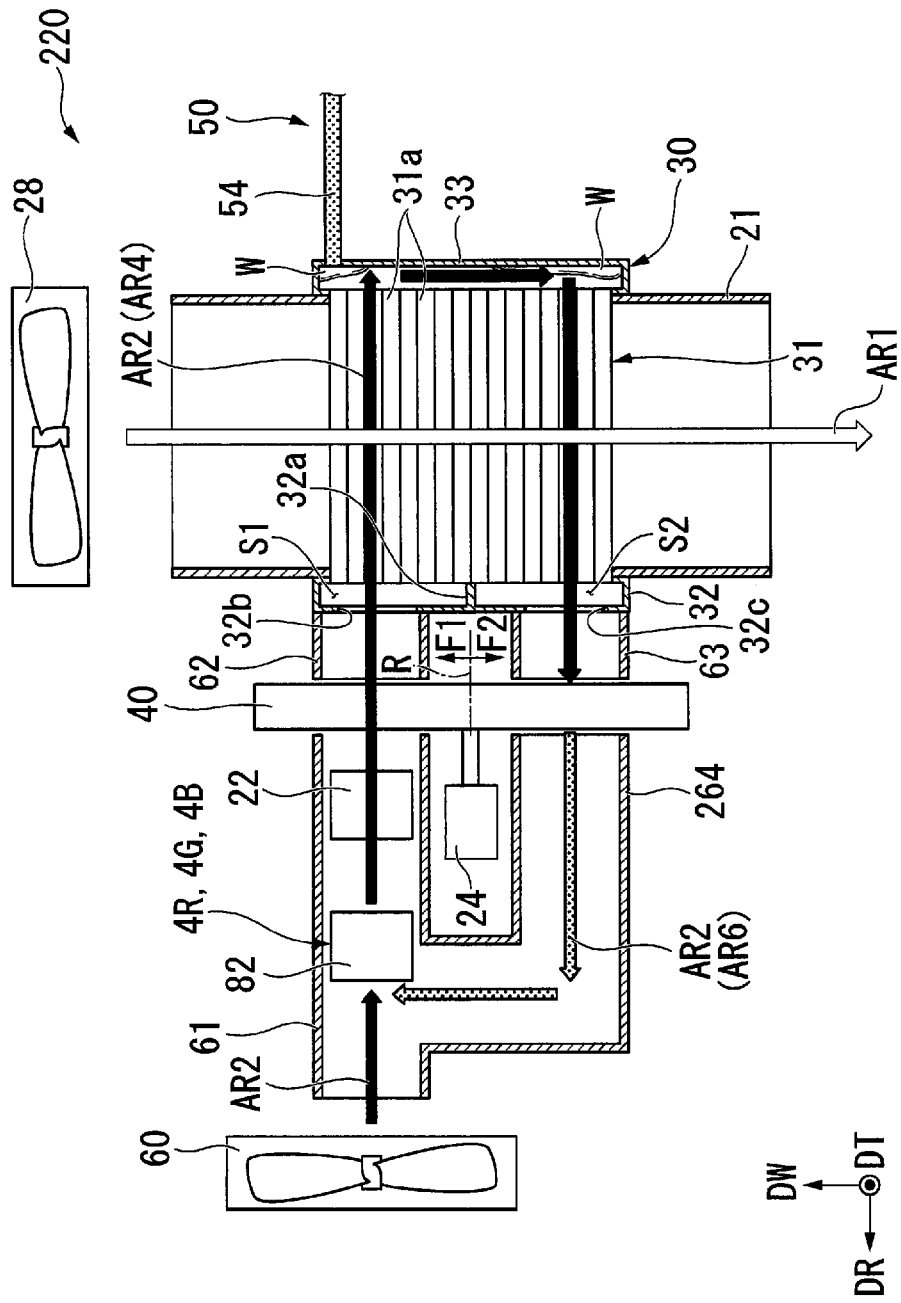
FIG. 10 is a schematic configuration diagram diagrammatically showing a refrigerant generator in a third embodiment.

The present embodiment differs from the first embodiment in terms of the flow of the air AR2 after exhausted from the heat exchanger 30. The same configurations as those in the embodiments described above have the same reference characters as appropriate or otherwise handled and will therefore not be described in some cases. FIG. 10 is a schematic configuration diagram diagrammatically showing a refrigerant generator 220 in the present embodiment.

In the refrigerant generator 220 in the present embodiment, a fourth duct 264 extends from a portion of the moisture absorbing/discharging member 40 that is the portion located in the second region F2 on the one side of the rotational axis direction DR (+DR side) to the first duct 61 and is connected thereto, as shown in FIG. 10. The interior of the fourth duct 264 is continuous with a portion of the interior of the first duct 61 that is the portion on the upstream (+DR side) of the heater 22.

The air AR2 having been exhausted from the heat exchanger 30 and having passed through a portion of the moisture absorbing/discharging member 40 that is the portion located in the second region F2 flows through the fourth duct 264. In the present embodiment, the air AR2 passing through the fourth duct 264 is not the air AR2 exhausted from the heat exchanger 30 but is the air AR6, from which part of the water vapor has been discharged into the moisture absorbing/discharging member 40. The air AR6 passing through the fourth duct 264 merges with the air AR2 delivered by the first air blower 60 and flowing into the first duct 61 and is delivered along with the air AR2 delivered by the first air blower 60 to a portion of the moisture absorbing/discharging member 40 that is the portion located in the first region F1. That is, in the present embodiment, the air AR6 having been exhausted from the heat exchanger 30 and having passed through a portion of the moisture absorbing/discharging member 40 that is the portion located in the second region F2 is delivered to a portion of the moisture absorbing/discharging member 40 that is the portion located in the first region F1.

The other configurations of the refrigerant generator 220 are the same as the configurations of the refrigerant generator 20 in the first embodiment.

According to the present embodiment, the air AR6 having been exhausted from the heat exchanger 30 and having passed through a portion of the moisture absorbing/discharging member 40 that is the portion located in the second region F2 is delivered to a portion of the moisture absorbing/discharging member 40 that is the portion located in the first region F1. Therefore, even when the water vapor contained in the air AR2 exhausted from the heat exchanger 30 cannot be trapped by the moisture absorbing/discharging member 40, the water vapor left in the air AR2 can be delivered to the heat exchanger 30 again. A situation in which the water vapor contained in the air AR2 exhausted from the heat exchanger 30 is exhausted to the ambient environment OP outside the projector 1 can thus be suppressed. The refrigerant generation efficiency of the refrigerant generator 220 can therefore be further improved.

Fourth Embodiment

The present embodiment differs from the first embodiment in that heat exhausted from a power supply 300 is used to operate a refrigerant generator 320. The same configurations as those in the embodiments described above have the same reference characters as appropriate or otherwise handled and will therefore not be described in some cases. FIG. is a schematic configuration diagram diagrammatically showing a refrigerant generator 320 in the present embodiment.

Figure 11:
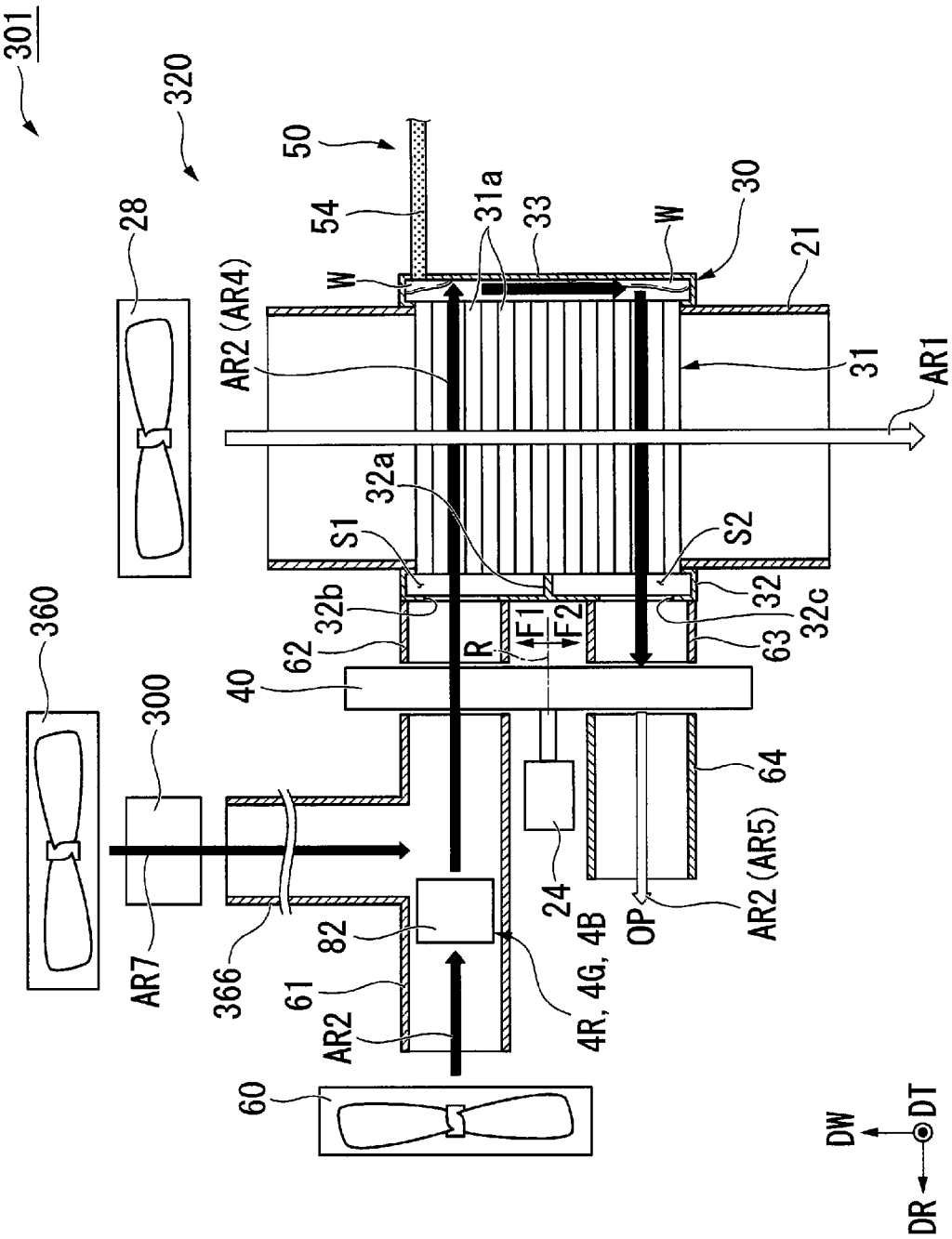
FIG. 11 is a schematic configuration diagram diagrammatically showing a refrigerant generator in a fourth embodiment.

A projector 301 according to the present embodiment includes the power supply 300, which supplies the projector 301 with electric power, and a third air blower 360, which delivers air AR7 to the power supply 300 to cool the power supply 300, as shown in FIG. 11.

The refrigerant generator 320 in the present embodiment does not include the heater 22, unlike the refrigerant generator 20 in the first embodiment. The refrigerant generator 320 in the present embodiment includes a sixth duct 366. The sixth duct 366 is a duct through which the air AR7 having been delivered from the third air blower 360 and having passed through the power supply 300 flows. The sixth duct 366 extends in the width direction DW, and an end of the sixth duct 366 that is the end on the other side of the width direction DW (−DW side) is connected to the first duct 61. The interior of the sixth duct 366 communicates with a portion of the interior of the first duct 61 that is the portion on the downstream (−DR side) of the portion where the extensions 82 are disposed.

The air AR7 delivered from the third air blower 360 to the power supply 300 passes through the power supply 300 and flows into the sixth duct 366 via the end thereof on the one side of the width direction DW (+DW side). The air AR7 having flowed into the sixth duct 366 flows into the first duct 61 and merges with the air AR2 delivered from the first air blower 60, and the combination of the air AR7 and the air AR2 is delivered to a portion of the moisture absorbing/discharging member 40 that is the portion located in the first region F1. That is, the air AR7 having cooled the power supply 300 is delivered to a portion of the moisture absorbing/discharging member 40 that is the portion located in the first region F1.

The other configurations of the refrigerant generator 320 are the same as the configurations of the refrigerant generator 20 in the first embodiment. The other configurations of the projector 301 are the same as the configurations of the projector 1 according to the first embodiment.

According to the present embodiment, the air AR7 having cooled the power supply 300 is delivered to a portion of the moisture absorbing/discharging member 40 that is the portion located in the first region F1. The power supply 300 has a relatively high heat resisting temperature among the portions of the projector 301, and the temperature of the air AR7 having cooled the power supply 300 is therefore relatively high. Delivering the air AR7 having cooled the power supply 300 to a portion of the moisture absorbing/discharging member 40 that is the portion located in the first region F1 can therefore raise the temperature of a portion of the moisture absorbing/discharging member 40 that is the portion located in the first region F1. Moisture can therefore be preferably discharged into the air AR2 and the air AR7 passing through a portion of the moisture absorbing/discharging member 40 that is the portion located in the first region F1.

As described above, according to the present embodiment, using the heat exhausted from the power supply 300 allows moisture to be discharged from the moisture absorbing/discharging member 40 into the air AR2 and the air AR7 with no heater 22 provided. The refrigerant W can therefore be preferably generated from the air AR2 and the air AR7 flowing into the heat exchanger 30 without use of energy that separately heats the air AR2 delivered from the first air blower 60. The refrigerant generation efficiency of the refrigerant generator 320 can therefore be further improved.

In the present embodiment, the air AR7 merges with the air AR2 delivered from the first air blower 60, and the combination of the air AR7 and the AR2 is delivered to the moisture absorbing/discharging member 40. In other words, it can therefore be said that the heat exhausted from the power supply 300 is used to raise the temperature of the air AR2 to be delivered to the moisture absorbing/discharging member 40. That is, in other words, it can be said that the third air blower 360, which delivers the air AR7, is a heater that heats the air AR2 before delivered to a portion of the moisture absorbing/discharging member 40 that is the portion located in the first region F1.

Fifth Embodiment

Figure 12:
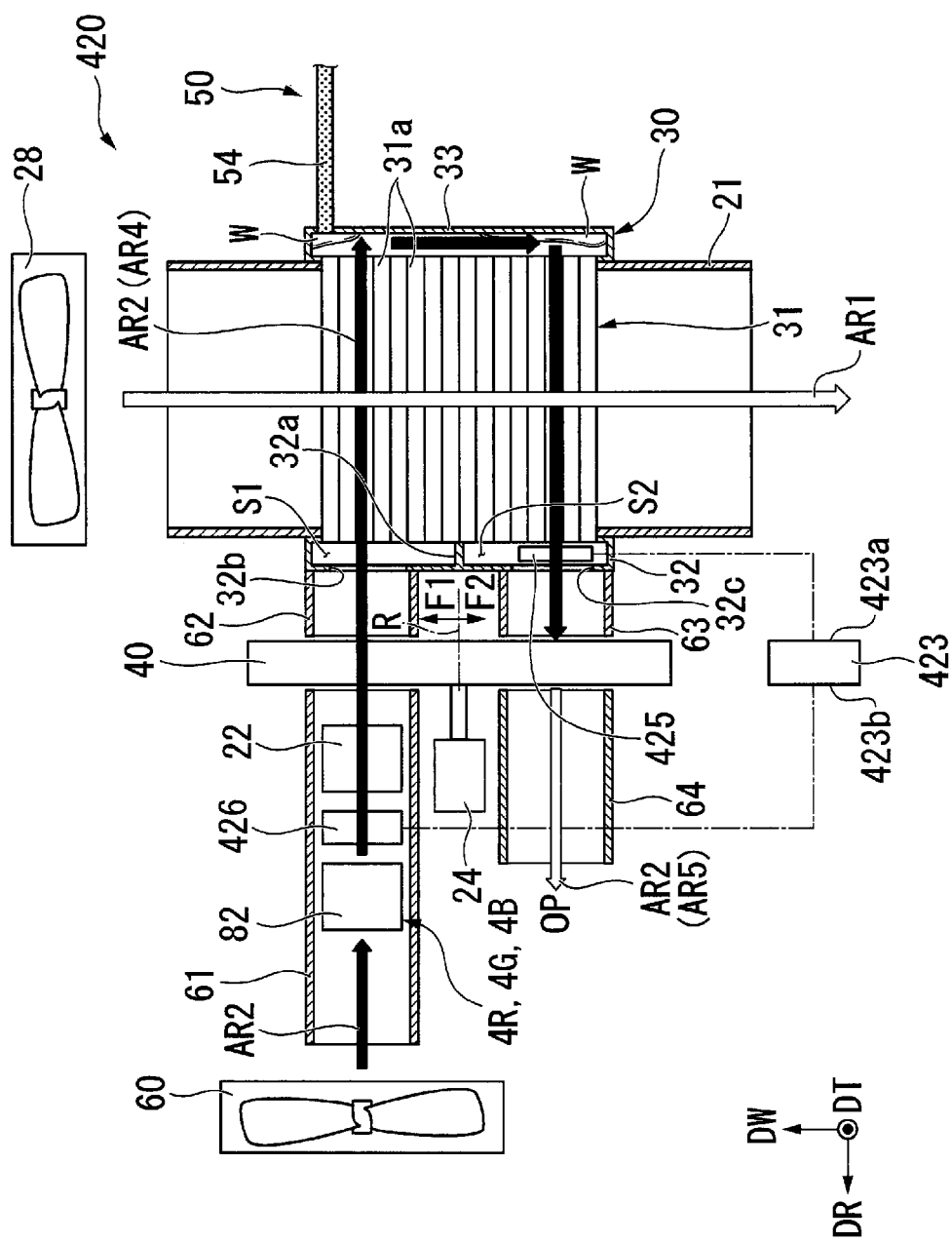
FIG. 12 is a schematic configuration diagram diagrammatically showing a refrigerant generator in a fifth embodiment.

The present embodiment differs from the first embodiment in that a thermoelectric device 423 is provided. The same configurations as those in the embodiments described above have the same reference characters as appropriate or otherwise handled and will therefore not be described in some cases. FIG. 12 is a schematic configuration diagram diagrammatically showing a refrigerant generator 420 in the present embodiment.

The refrigerant generator 420 in the present embodiment includes the thermoelectric device 423, a first heat transfer member 425, and a second heat transfer member 426, as shown in FIG. 12. The thermoelectric device 423 is a Peltier device. The thermoelectric device 423 has a heat absorbing surface 423a and a heat dissipating surface 423b. The thermoelectric device 423, to which electric power is supplied, absorbs heat via the heat absorbing surface 423a and dissipates heat via the heat dissipating surface 423b.

The first heat transfer member 425 is a member thermally connected to the heat absorbing surface 423a. The state in which the first heat transfer member 425 is thermally connected to the heat absorbing surface 423a may be a state in which the first heat transfer member 425 is connected to the heat absorbing surface 423a with heat being transferable between the heat absorbing surface 423a and the first heat transfer member 425. Since the heat absorbing surface 423a is a surface via which heat is absorbed, heat is transferable from the first heat transfer member 425 to the heat absorbing surface 423a. The first heat transfer member 425 is provided in the heat exchanger 30. More specifically, the first heat transfer member 425 is provided in the second space S2 in the first lid 32. The first heat transfer member 425 is, for example, a heat sink.

The second heat transfer member 426 is a member thermally connected to the heat dissipating surface 423b. The state in which the second heat transfer member 426 is thermally connected to the heat dissipating surface 423b may be a state in which the second heat transfer member 426 is connected to the heat dissipating surface 423b with heat being transferable between the heat dissipating surface 423b and the second heat transfer member 426. Since the heat dissipating surface 423b is a surface via which heat is dissipated, heat is transferable from the heat dissipating surface 423b to the second heat transfer member 426. The second heat transfer member 426 is provided in the first duct 61. More specifically, the second heat transfer member 426 is provided between the extensions 82 and the heater 22 in the first duct 61. The second heat transfer member 426 is, for example, a heat sink.

When electric power is supplied to the thermoelectric device 423, heat of the first heat transfer member 425 is absorbed via the heat absorbing surface 423a, so that the first heat transfer member 425 is cooled. The first heat transfer member 425 thus absorbs the heat of the air AR2 in the second space S2. That is, the first heat transfer member 425 cools the air AR2 delivered to the heat exchanger 30.

The heat absorbed via the heat absorbing surface 423a is transferred to the heat dissipating surface 423b and discharged to the second heat transfer member 426. The heat generated by the electric power supplied to the thermoelectric device 423 is also dissipated via the heat dissipating surface 423b to the second heat transfer member 426. The heat discharged to the second heat transfer member 426 is discharged into the air AR2 flowing through the interior of the first duct 61. The second heat transfer member 426 thus heats the air AR2 before delivered to a portion of the moisture absorbing/discharging member 40 that is the portion located in the first region F1.

The other configurations of the refrigerant generator 420 are the same as the configurations of the refrigerant generator 20 in the first embodiment.

According to the present embodiment, the refrigerant generator 420 causes the thermoelectric device 423, which has the heat absorbing surface 423a and the heat dissipating surface 423b, to cool and heat the air AR2 delivered by the first air blower 60. The energy that heats the air AR2 can therefore be lowered, whereby the refrigerant generation efficiency of the refrigerant generator 420 can be improved. A detailed description will be made below.

When electric power is supplied to the thermoelectric device 423, the thermoelectric device 423 absorbs the heat via the heat absorbing surface 423a in accordance with the supplied electric power and cools the air AR2 in the heat exchanger 30 via the first heat transfer member 425. The amount of refrigerant W generated in the heat exchanger 30 can therefore be increased. The thermoelectric device 423 discharges the heat generated by the supplied electric power and the heat absorbed from the air AR2 via the first heat transfer member 425 to the second heat transfer member 426 via the heat dissipating surface 423b. The thermoelectric device 423 thus heats via the second heat transfer member 426 the air AR2 before delivered to the moisture absorbing/discharging member 40.

As described above, according to the present embodiment, the heat absorbed from the first heat transfer member 425 provided in the heat exchanger 30 can be used to heat the air AR2 before delivered to a portion of the moisture absorbing/discharging member 40 that is the portion located in the first region F1. The energy that heats the air AR2 before delivered to a portion of the moisture absorbing/discharging member 40 that is the portion located in the first region F1 can be lowered with the amount of refrigerant W generated in the heat exchanger 30 increased. The refrigerant generation efficiency of the refrigerant generator 420 can therefore be further improved.

In the embodiments according to the present disclosure, the following configurations and methods can also be employed.

The heater that heats the air before delivered to a portion of the moisture absorbing/discharging member that is the portion located in the first region may not be provided. Even in this case, the heat exchanger can preferably generate the refrigerant, for example, when the temperature of the refrigerant having vaporized at the cooling target is sufficiently high. The refrigerant is not limited to a specific substance as long as the refrigerant can cool the cooling target and may be any substance other than water. The air having been exhausted from the heat exchanger and having passed multiple times through a portion of the moisture absorbing/discharging member that is the portion located in the second region may be delivered to a portion of the moisture absorbing/discharging member that is the portion located in the first region. The air having cooled a portion of the projector excluding the cooling target cooled by the cooler and the power supply may be delivered to a portion of the moisture absorbing/discharging member that is the portion located in the first region. The refrigerant transformed into a gas at the cooling target may be delivered by an air blower different from the first air blower and merge with the air delivered by the first air blower.

The cooling target in the embodiments described above is the light modulation units, but not necessarily. The cooling target is not limited to a specific component and may be the light modulators and may include at least one of the light modulators, the light modulation units, a light source apparatus, a wavelength converter that converts the wavelength of the light outputted from the light source apparatus, a diffuser that diffuses the light outputted from the light source apparatus, or a polarization converter that converts the polarization direction of the light outputted from the light source apparatus. According to the configuration described above, each portion of the projector can be cooled in the same manner described above. The cooled part does not necessarily have a specific shape. The dustproof enclosure does not necessarily have a specific shape. The dustproof enclosure may not be provided.

In the embodiments described above, the description has been made with reference to the case where the present disclosure is applied to a transmission-type projector, and the present disclosure is also applicable to a reflection-type projector. The term "transmission-type" means that the light modulators each including a liquid crystal panel or any other component transmit light. The term "reflection-type" means that the light modulators reflect light. The light modulators are each not limited, for example, to a liquid crystal panel and may, for example, be a micromirror-based light modulator.

In the embodiments described above, the projector using the three light modulators has been presented by way of example. The present disclosure is also applicable to a projector using only one light modulator and a projector using four or more light modulators.

The configurations described in the present specification can be combined with each other as appropriate to the extent that the combination causes no contradiction between the combined configurations.

What is claimed is:

1. A projector including a cooling target, the projector comprising:
   a light source configured to emit light;
   a light modulator configured to modulate the light emitted from the light source in accordance with an image signal;
   a projection optical apparatus configured to project the light modulated by the light modulator; and
   a cooler configured to cool the cooling target based on transformation of a refrigerant into a gas,
   wherein the cooler includes
   a refrigerant generator configured to generate the refrigerant, and
   a refrigerant sender configured to send the generated refrigerant toward the cooling target,
   the refrigerant generator includes
   a rotating moisture absorbing/discharging member,
   a first air blower configured to deliver air containing the refrigerant transformed into the gas at the cooling target to a first portion of the moisture absorbing/discharging member which is a portion located in a first region,
   a heat exchanger connected to the refrigerant sender, and
   a second air blower configured to cool the heat exchanger,
   the air after passing through the first portion of the moisture absorbing/discharging member flows into the heat exchanger, and
   air exhausted from the heat exchanger is delivered to a second portion of the moisture absorbing/discharging member which is a portion located in a second region different from the first region.

2. The projector according to claim 1,
wherein the refrigerant generator includes a heater configured to heat the air before delivered to the first portion of the moisture absorbing/discharging member.

3. The projector according to claim 1,
wherein the first air blower delivers air to the cooling target and delivers the air after delivered to the cooling target to the first portion of the moisture absorbing/discharging member.

4. The projector according to claim 1,
wherein the air after exhausted from the heat exchanger and after passing through the second portion of the moisture absorbing/discharging member is delivered to the first portion of the moisture absorbing/discharging member.

5. The projector according to claim 1,
wherein the air exhausted from the heat exchanger passes multiple times through the second portion of the moisture absorbing/discharging member.

6. The projector according to claim 1, further comprising a power supply configured to supply the projector with electric power,
wherein air after cooling the power supply is delivered to the first portion of the moisture absorbing/discharging member.

7. The projector according to claim 1,
wherein the refrigerant generator includes
a thermoelectric device having a heat absorbing surface and a heat dissipating surface,
a first heat transfer member thermally connected to the heat absorbing surface, and
a second heat transfer member thermally connected to the heat dissipating surface,
the first heat transfer member cools the air delivered to the heat exchanger, and
the second heat transfer member heats the air before delivered to the first portion of the moisture absorbing/discharging member.

8. The projector according to claim 1,
wherein the cooling target is the light modulator.

* * * * *